(12) United States Patent
Tanaka et al.

(10) Patent No.: US 8,013,923 B2
(45) Date of Patent: *Sep. 6, 2011

(54) PICTURE DISPLAY CONTROLLING APPARATUS AND PICTURE DISPLAY CONTROLLING METHOD

(75) Inventors: Sho Tanaka, Chiba (JP); Osamu Date, Saitama (JP); Katsumi Matsuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,800

(22) Filed: Mar. 22, 2010

(65) Prior Publication Data

US 2010/0177233 A1    Jul. 15, 2010

Related U.S. Application Data

(63) Continuation of application No. 10/563,160, filed as application No. PCT/JP2005/011884 on Jun. 22, 2005, now Pat. No. 7,714,924.

(30) Foreign Application Priority Data

Jun. 23, 2004  (JP) .................................. 2004-184852

(51) Int. Cl.
*H04N 5/222* (2006.01)
(52) U.S. Cl. .............................. 348/333.02; 348/333.05
(58) Field of Classification Search ............ 348/333.01–333.02, 333.11–333.12, 333.05
See application file for complete search history.

(56) References Cited

U.S. PATENT DOCUMENTS

| 6,249,316 | B1 | 6/2001 | Anderson |
| 6,771,877 | B1 | 8/2004 | Ono et al. |
| 2002/0039203 | A1 | 4/2002 | Endo et al. |
| 2002/0071351 | A1 | 6/2002 | Hamada et al. |

(Continued)

FOREIGN PATENT DOCUMENTS

EP    0 843 311 A2    5/1998

(Continued)

OTHER PUBLICATIONS

Australian Patent Office Written Opinion and Search Report; Application No. SG 200601245-4; dated Jun. 22, 2005.

(Continued)

*Primary Examiner* — Tuan Ho
(74) *Attorney, Agent, or Firm* — Rader, Fishman & Grauer PLLC

(57) ABSTRACT

Disclosed herein is a picture display controlling apparatus capable of improving the user's ease of operation upon selecting picture data on a small-size screen of digital cameras or the like. Picture data items held in a data holding unit (310) are sorted into picture groups. The location of the picture data item most recently displayed from any of the picture groups is held as a picture resume pointer in a resume pointer holding unit (320). With an operation input accepted from the user by an operation inputting device (340), a display controlling unit (390) causes a displaying unit (350) to display the picture designated by the operation input while effecting transition from the current display status retained in a status holding unit (330). If the operation input designates transition from a first picture group to a second picture group, the location of the picture data item currently displayed from the first picture group is placed into the resume pointer holding unit (320), and the location of the picture data item to be displayed anew from the second picture group is retrieved from the resume pointer holding unit (320).

15 Claims, 22 Drawing Sheets

U.S. PATENT DOCUMENTS

| | | |
|---|---|---|
| 2003/0086012 A1 | 5/2003 | Stavely et al. |
| 2003/0169286 A1 | 9/2003 | Misawa |
| 2004/0056883 A1 | 3/2004 | Wierowski |
| 2004/0179122 A1 | 9/2004 | Morimoto et al. |
| 2004/0201752 A1 | 10/2004 | Parulski et al. |
| 2005/0259173 A1* | 11/2005 | Nakajima et al. ........ 348/333.12 |
| 2006/0181613 A1* | 8/2006 | Cazier ...................... 348/207.99 |

FOREIGN PATENT DOCUMENTS

| | | |
|---|---|---|
| EP | 0 938 228 | 5/2002 |
| EP | 1 205 933 A2 | 5/2002 |
| JP | 11-234600 A | 8/1999 |
| JP | 2000-155638 A | 6/2000 |
| JP | 2000-284878 A | 10/2000 |
| JP | 20001-278563 | 10/2000 |
| JP | 2003-242004 A | 8/2003 |
| JP | 2003-339013 A | 11/2003 |

OTHER PUBLICATIONS

International Search Resort mailed Sep. 6, 2005.
International Search Opinion mailed Sep. 6, 2005.
Japanese Office Action issued Mar. 16, 2010 for corresponding Japanese Application No. 2004-184852.
Supplementary European Search Report issued Mar. 15, 2011 for corresponding European Application No. 05 78 0107.

* cited by examiner

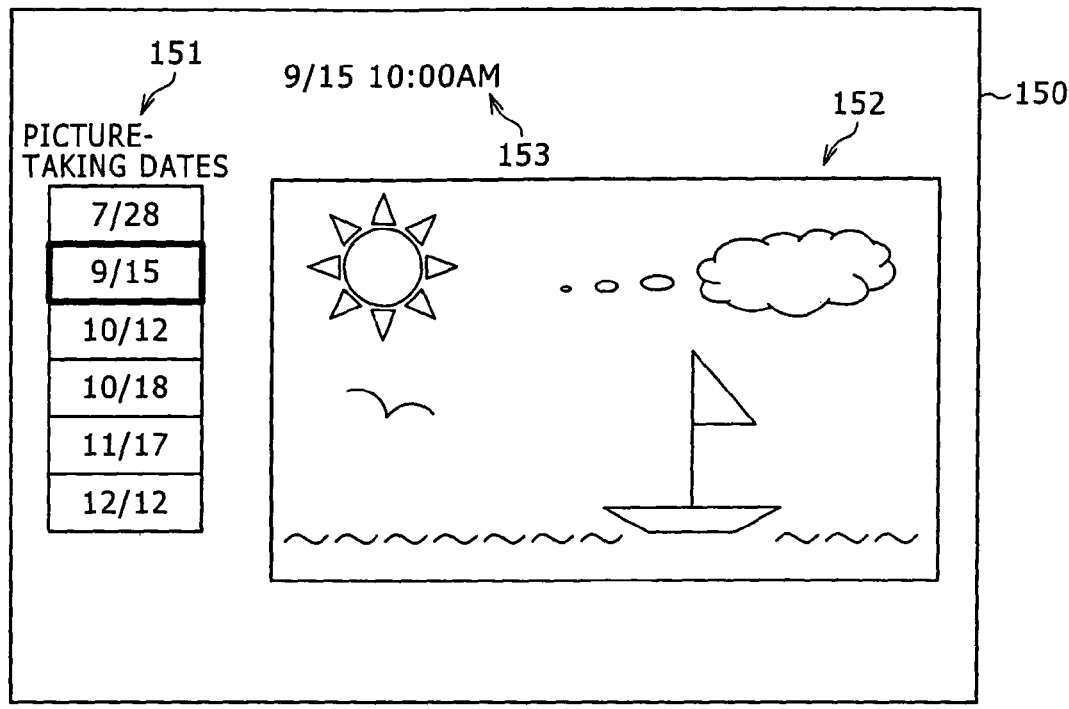

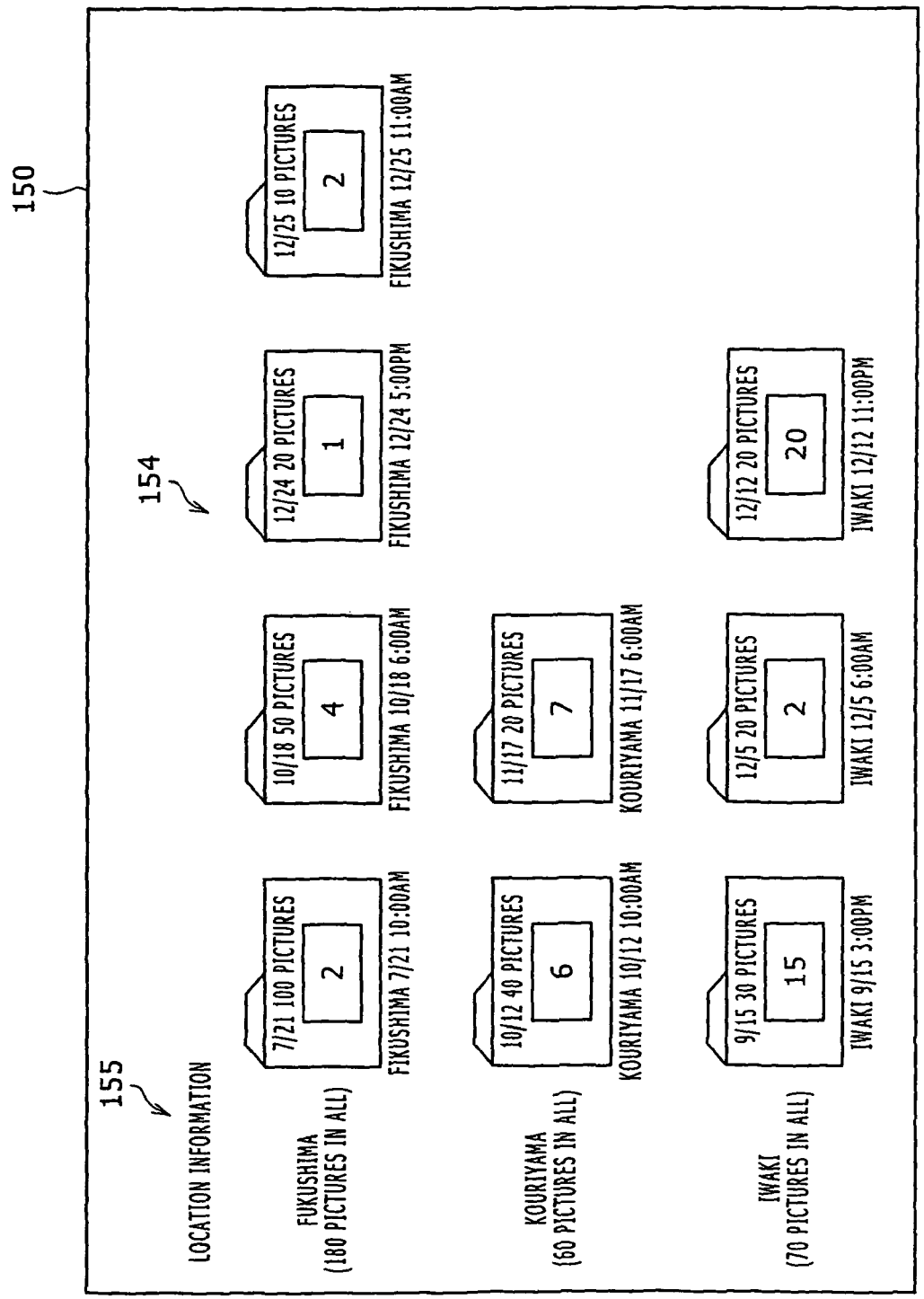

FIG. 6
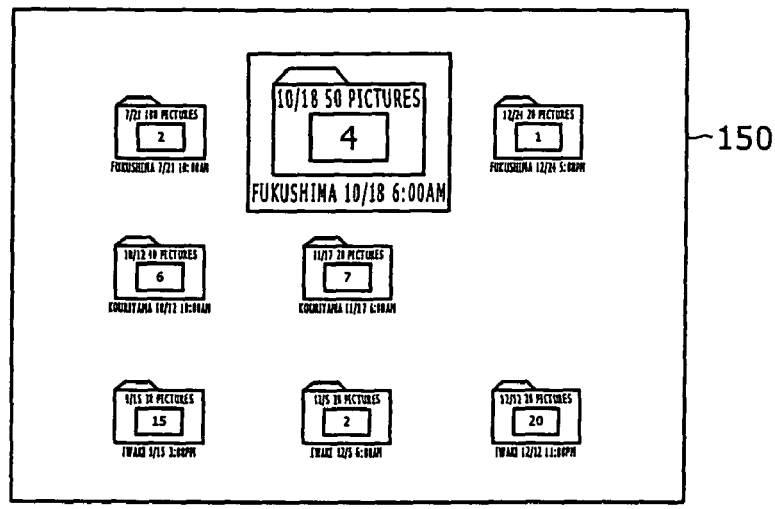
(a)
ENTERED
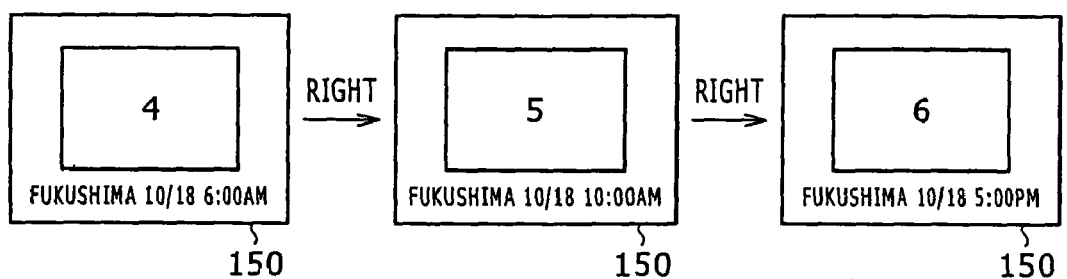
(b)  (c)  (d)
(e)
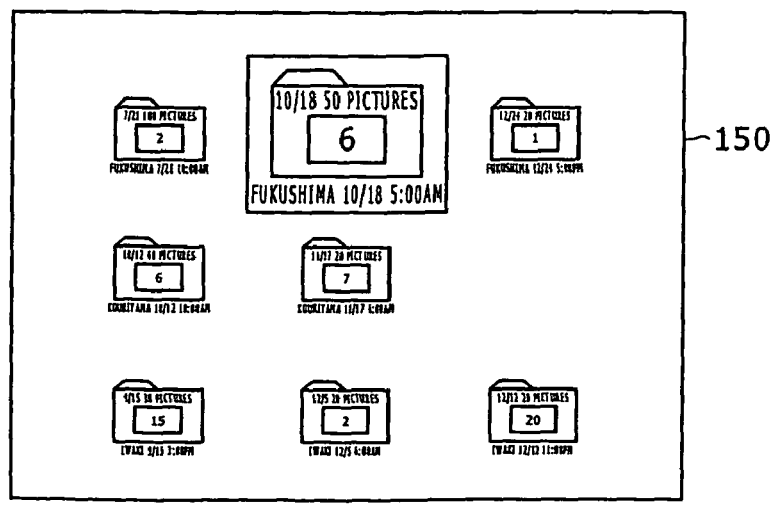

F I G . 7
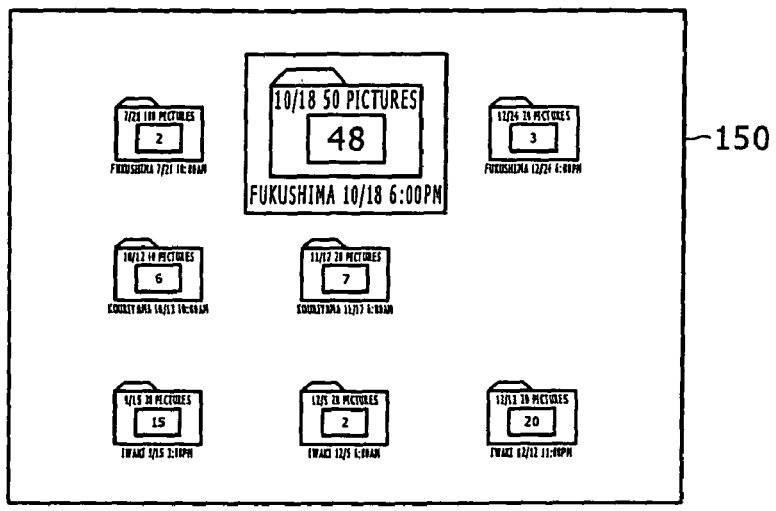
(a)
ENTERED
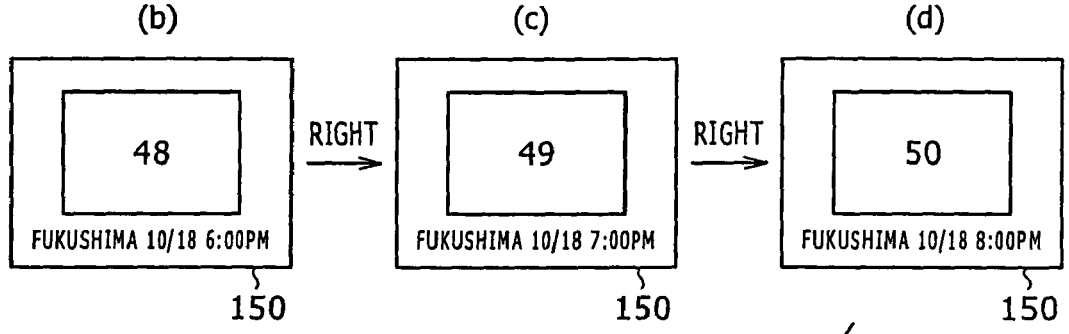
(b) (c) (d)
RIGHT
(e)
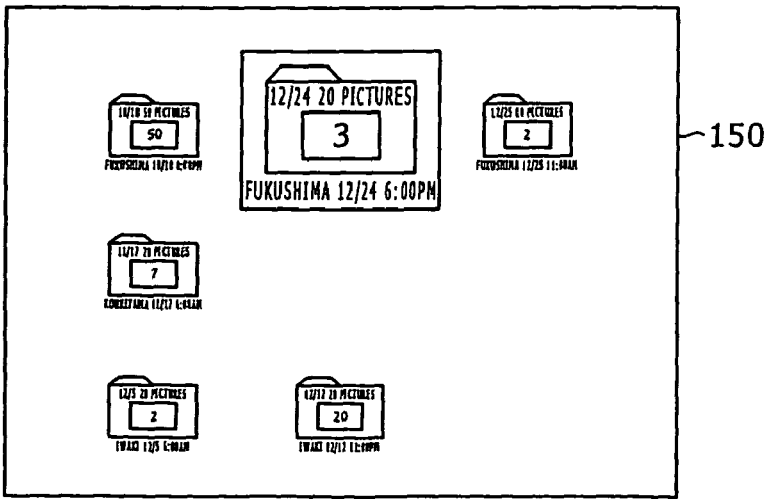

FIG. 8
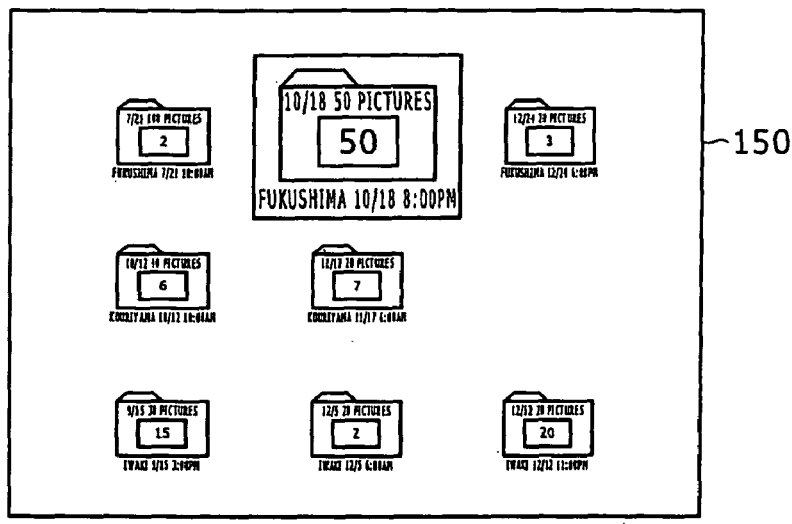
(a)
ENTERED
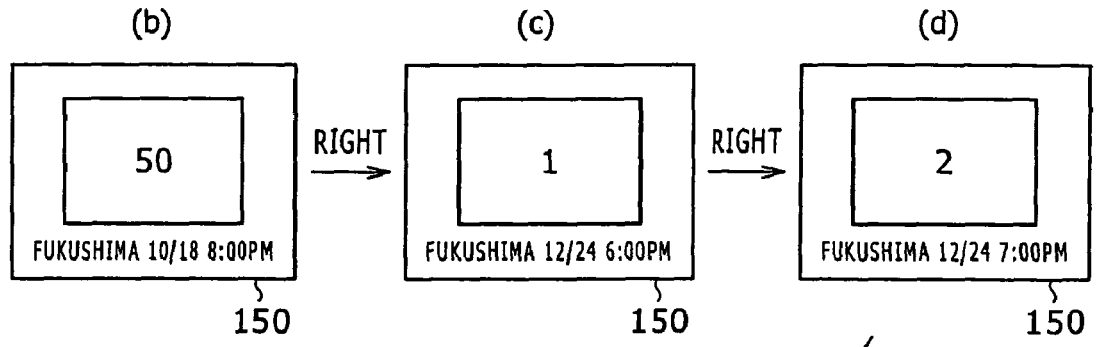
(b) → RIGHT → (c) → RIGHT → (d)
ENDED
(e)
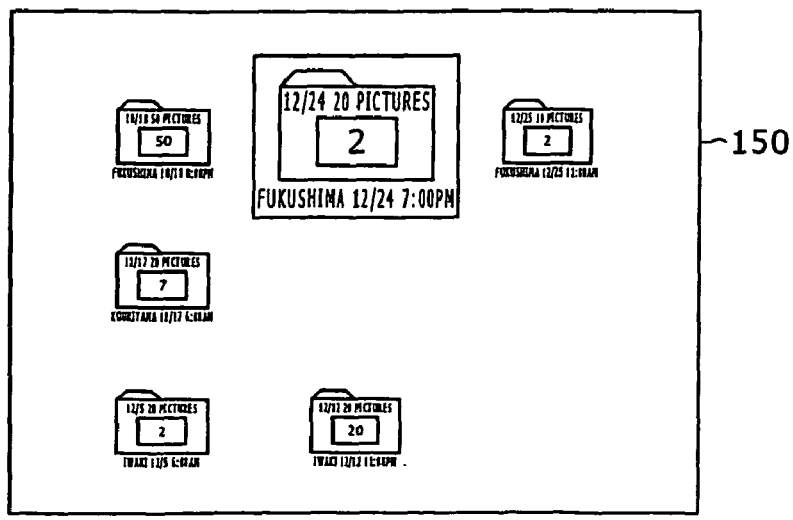

FIG. 9
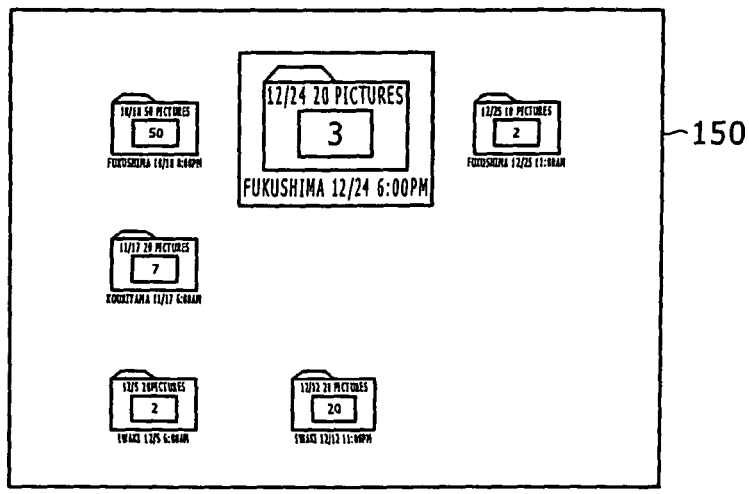
ENTERED
(b) 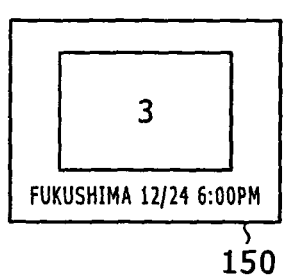 RIGHT (c) 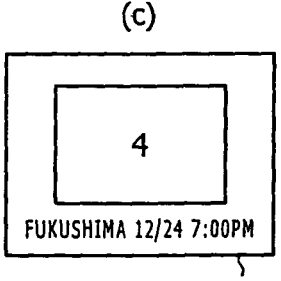 RIGHT (d) 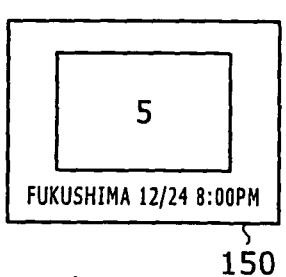
DOWN
(e) 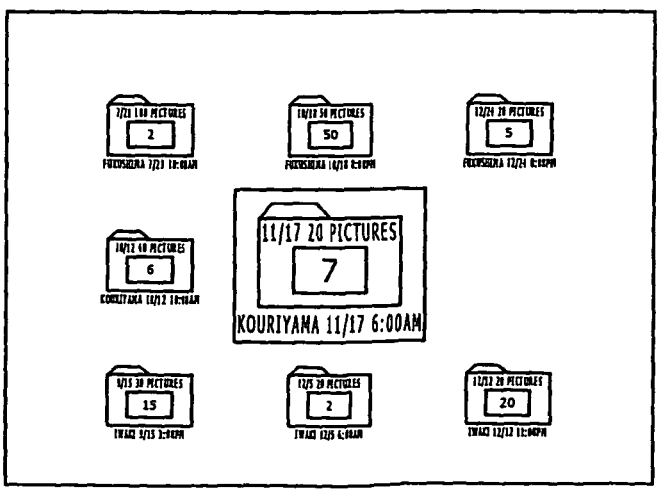

FIG. 10
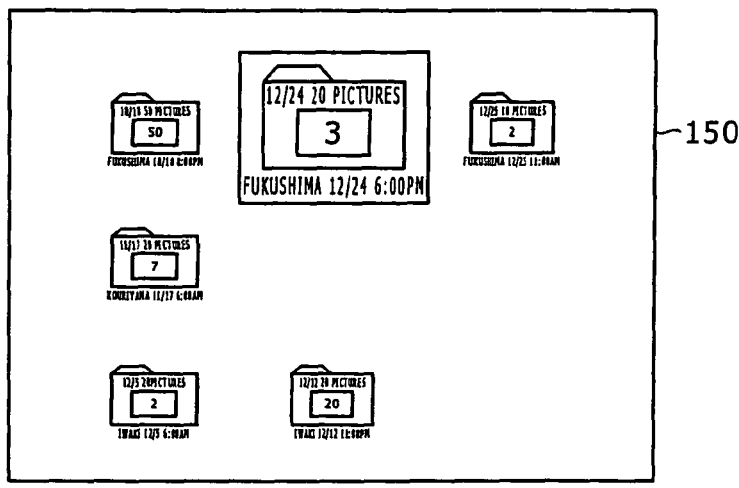
ENTERED
(a)
(b) 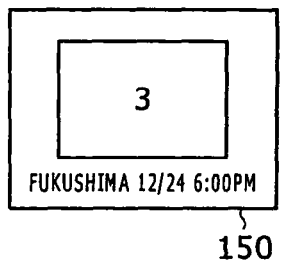 DOWN (c) 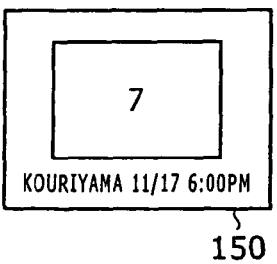 RIGHT (d) 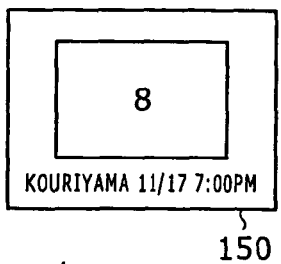
ENDED
(e)
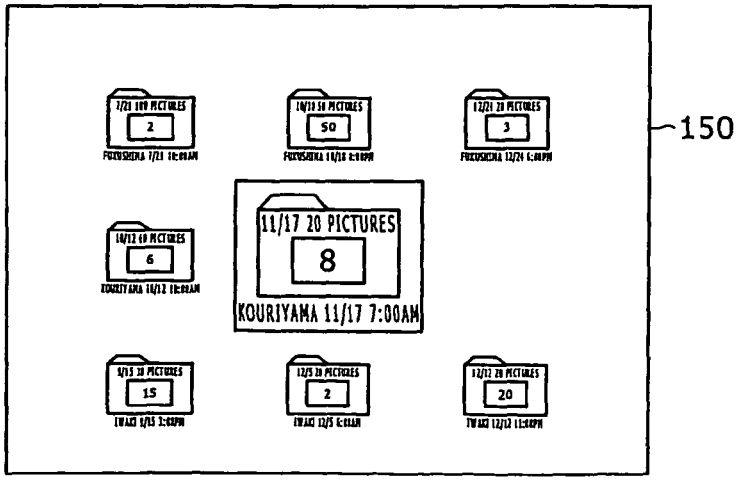

PICTURE DISPLAY CONTROLLING APPARATUS AND PICTURE DISPLAY CONTROLLING METHOD

CROSS REFERENCE TO RELATED APPLICATIONS

This is a Continuation Application of U.S. patent application Ser. No. 10/563,160, filed Jan. 4, 2006, which is based on a National Stage Application of PCT/JP05/011884, filed Jun. 22, 2005, which in turn claims priority from Japanese Application No.: 2004-184852, filed on Jun. 23, 2004, the entire contents of which are incorporated herein by reference.

TECHNICAL FIELD

The present invention relates to a picture display controlling apparatus. More particularly, the invention relates to a picture display controlling apparatus and a picture display controlling method for consecutively displaying accumulated picture data, and to a program for causing a computer to carrying out the method.

BACKGROUND ART

In recent years, with the advent of flash memories of large capacities and DVDs (digital versatile discs), the storage volume of recording media has increased even in relatively small-sized electronic devices such as digital video camera, digital still cameras and mobile phones. That trend is making it possible for these small electronic devices to store a large number of pictures inside. Generally, there are two ways for a user to browse the recorded pictures: a full-screen display involving the display of one recorded picture after another over the entire screen through selective manipulations of operation keys; and a catalog-like display with a plurality of thumbnails arrayed on a single screen. The two ways to look up the recorded pictures may be switched as needed.

On a typical digital camera, immediately after picture-taking mode is stopped and replaced by reproduction mode, the picture taken with the highest frame number appears on the screen. Thereafter, either the full-screen display function or the catalog-like display function is selected by operation of a particular key or keys (e.g., see Japanese Patent Laid-open No. 2000-278563 (FIG. 24)).

Where the typical technique cited above is in use, the full-screen display function and the catalog-like display function are switched as needed for picture display. However, the full-screen display function generally involves the user's having to manipulate specific keys to display consecutively the pictures taken which have been sorted chronologically, i.e., by picture-taking date. As a result, if there are numerous pictures taken, the user is required to perform an interminable single-frame advance operation until the desired picture is reached.

On the other hand, the catalog-like display function involves displaying a plurality of thumbnails representing the corresponding pictures on the single screen, the thumbnails being displayed typically in zigzag fashion by picture-taking date starting from the top left corner of the screen. On that screen, the user may operate keys to point a cursor at a desired picture for browsing. However, digital still cameras and similar electronic devices are typically equipped with a small screen which, when showing all taken pictures sorted by picture-taking date, makes it troublesome for the user to pinpoint a particular picture.

It is therefore an object of the present invention to overcome the above-described drawbacks and disadvantages and to provide an apparatus and a method for dividing picture data into picture groups and storing the location of the picture data displayed most recently in each picture group, whereby the user's ease of operation is improved.

DISCLOSURE OF INVENTION

In achieving the foregoing and other objects of the present invention and as claimed in claim 1 thereof, there is provided a picture display controlling apparatus including: data holding means for holding a plurality of picture data items; resume pointer holding means for holding as a picture resume pointer the location of the picture data item most recently displayed from any of picture groups obtained by sorting the picture data items; operation inputting means for accepting an operation input for designating any of the picture groups or any of the picture data items in the designated picture group; and display controlling means for exercising control such as to display the designated picture group or the designated picture data item in the designated picture group; wherein, if the operation input accepted by the operation inputting means designates transition from a first picture group to a second picture group, then the display controlling means causes the resume pointer holding means to hold the location of the picture data item most recently displayed from the first picture group as the picture resume pointer for the first picture group, while retrieving the picture resume pointer for the second picture group from the resume pointer holding means in order to display anew the picture data item pointed to by the retrieved picture resume pointer. That is, when the operation input designates transition from one picture group to another, the inventive picture display controlling apparatus retains the locations of the picture data items in the picture groups involved, thus improving the user's ease of operation in selecting the desired picture data to be displayed.

In one preferred structure of the picture display controlling apparatus according to claim 1 of the present invention, as claimed in claim 2 thereof, the operation inputting means may include picture data switching operation inputting means for accepting an operation input for switching the picture data items on an item by item basis; and if the operation input accepted by the picture data switching operation inputting means designates transition beyond the picture data item at one end of a picture data item array constituting a given picture group, then the display controlling means may display anew the picture data item at the other end of the array forming the picture group in question. Illustratively, if the operation input designates a forward transition from the picture data item at the trail end of the picture data item array in one picture group to a picture data item beyond, then the picture display controlling apparatus of this preferred structure may display anew the picture data item at the beginning of the picture data item array within the group. If the operation input designates a backward transition from the picture data item at the beginning of the picture data item array in the picture group to a picture data item beyond, then the preferred picture display controlling apparatus may display anew the picture data item at the trail end of the picture data item array within the group.

In another preferred structure of the picture display controlling apparatus according to claim 1 of the present invention, as claimed in claim 3 thereof, the operation inputting means may include picture data switching operation inputting means for accepting an operation input for switching the picture data items on an item by item basis; and if the operation input accepted by the picture data switching operation inputting means designates transition from the picture data item at one end of a picture data item array in the first picture group to the second picture group, then the display controlling means may cause the resume pointer holding means to hold the location of the picture data item most recently displayed from the first picture group as the picture resume pointer for the first picture group, while displaying anew the picture data item at one end of a picture data item array constituting the second picture group. Illustratively, if the operation input designates a forward transition from the picture data item at the trail end of the picture data item array in one picture group to a picture data item beyond, then the picture display controlling apparatus of this preferred structure may display anew the picture data item at the beginning of the picture data item array in the next picture group. If the operation input designates a backward transition from the picture data item at the beginning of the picture data item array in the picture group to a picture data item beyond, then the preferred picture display controlling apparatus may display anew the picture data item at the trail end of the picture data item array in the preceding picture group.

In a further preferred structure of the picture display controlling apparatus according to claim 1 of the present invention, as claimed in claim 4 thereof, the picture groups may be sorted by picture-taking information about the picture data items. Illustratively, the picture groups may be sorted by such picture data attributes as picture-taking dates and location information. This allows pictures to be displayed in increments of particular picture groups.

Another picture display controlling apparatus according to the present invention, as claimed in claim 5 thereof, includes: data holding means for holding a plurality of picture data items; picture resume pointer holding means for holding as a picture resume pointer the location of the picture data item most recently displayed from any of picture groups obtained by sorting the picture data items; picture group resume pointer holding means for holding as a picture group resume pointer the location of the picture group most recently displayed from any of picture group arrays derived from the picture groups; operation inputting means for accepting an operation input for designating any of the picture group arrays, any of the picture groups in the designated picture group array, or any of the picture data items in the designated picture group; and display controlling means for exercising control such as to display the designated picture group array, the designated picture group in the designated picture group array, or the designated picture data item in the designated picture group; wherein, if the operation input accepted by the operation inputting means designates transition from a first picture group array to a second picture group array, then the display controlling means causes the picture group resume pointer holding means to hold the location of the picture group most recently displayed from the first picture group array as the picture group resume pointer for the first picture group array, while retrieving the picture group resume pointer for the second picture group array from the picture group resume pointer holding means in order to display anew the picture group pointed to by the retrieved picture group resume pointer; and if the operation input accepted by the operation inputting means designates transition from a first picture group to a second picture group, then the display controlling means causes the picture resume pointer holding means to hold the location of the picture data item most recently displayed from the first picture group as the picture resume pointer for the first picture group, while retrieving the picture resume pointer for the second picture group from the picture resume pointer holding means in order to display anew the picture data item pointed to by the retrieved picture resume pointer. That is, if the operation input designates transition from one picture group to another, then the inventive picture display controlling apparatus of this structure retains the locations of the picture data items in the picture groups involved; if the operation input designates transition from one picture group array to another, then the inventive apparatus retains the locations of the picture groups in the picture group arrays involved. This improves the user's ease of operation in selecting the desired picture data to be displayed.

In one preferred structure of the picture display controlling apparatus according to claim 5 of the present invention, as claimed in claim 6 thereof, the operation inputting means may include picture data switching operation inputting means for accepting an operation input for switching the picture data items on an item by item basis; and if the operation input accepted by the picture data switching operation inputting means designates transition beyond the picture data item at one end of a picture data item array constituting a given picture group, then the display controlling means may display anew the picture data item at the other end of the array forming the picture group in question. Illustratively, if the operation input designates a forward transition from the picture data item at the trail end of the picture data item array in one picture group to a picture data item beyond, then the picture display controlling apparatus of this preferred structure may display anew the picture data item at the beginning of the picture data item array within the group. If the operation input designates a backward transition from the picture data item at the beginning of the picture data item array in the picture group to a picture data item beyond, then the preferred picture display controlling apparatus may display anew the picture data item at the trail end of the picture data item array within the group.

In another preferred structure of the picture display controlling apparatus according to claim 5 of the present invention, as claimed in claim 7 thereof, the operation inputting means may include picture data switching operation inputting means for accepting an operation input for switching the picture data items on an item by item basis; and if the operation input accepted by the picture data switching operation inputting means designates transition from the picture data item at one end of a picture data item array in the first picture group to the second picture group, then the display controlling means may cause the resume pointer holding means to hold the location of the picture data item most recently displayed from the first picture group as the picture resume pointer for the first picture group, while displaying anew the picture data item at one end of a picture data item array constituting the second picture group. Illustratively, if the operation input designates a forward transition from the picture data item at the trail end of the picture data item array in one picture group to a picture data item beyond, then the picture display controlling apparatus of this preferred structure may display anew the picture data item at the beginning of the picture data item array in the next picture group. If the operation input designates a backward transition from the picture data item at the beginning of the picture data item array in the picture group to a picture data item beyond, then the preferred picture display controlling apparatus may display anew the picture data item at the trail end of the picture data item array in the preceding picture group.

In a further preferred structure of the picture display controlling apparatus according to claim 5 of the present invention, as claimed in claim 8 thereof, the operation inputting means may include picture data switching operation inputting means for accepting an operation input for switching the picture data items on an item by item basis; and if the operation input accepted by the picture data switching operation inputting means designates transition from the picture data item at one end of a picture data item array in the first picture group to the second picture group, then the display controlling means may cause the resume pointer holding means to hold the location of the picture data item most recently displayed from the first picture group as the picture resume pointer for the first picture group, while displaying anew the second picture group. Illustratively, if the operation input designates a forward transition from the picture data item at the trail end of the picture data item array in one picture group to a picture data item beyond, then the picture display controlling apparatus of this preferred structure may display anew the next picture group. If the operation input designates a backward transition from the picture data item at the beginning of the picture data item array in the picture group to a picture data item beyond, then the preferred picture display controlling apparatus may display anew the preceding picture group.

In an even further preferred structure of the picture display controlling apparatus according to claim 5 of the present invention, as claimed in claim 9 thereof, the picture groups may be sorted by picture-taking information about the picture data items; and the picture group arrays may be formed on the basis of the picture-taking information about the picture data items included in the picture groups. Illustratively, particular picture groups and picture group arrays may be created on the basis of such picture data attributes as picture-taking dates and location information. This allows pictures to be displayed in increments of specific picture groups and picture group arrays.

A picture displaying apparatus according to the present invention, as claimed in claim 10 thereof, includes: data holding means for holding a plurality of picture data items; resume pointer holding means for holding as a picture resume pointer the location of the picture data item most recently displayed from any of picture groups obtained by sorting the picture data items; operation inputting means for accepting an operation input for designating any of the picture groups or any of the picture data items in the designated picture group; displaying means for displaying the picture groups or the picture data items in the picture groups; and display controlling means for causing the displaying means to display the designated picture group or the designated picture data item from the designated picture group in accordance with the operation input accepted by the operation inputting means; wherein, if the operation input accepted by the operation inputting means designates transition from a first picture group to a second picture group, then the display controlling means causes the resume pointer holding means to hold the location of the picture data item most recently displayed from the first picture group as the picture resume pointer for the first picture group, while retrieving the picture resume pointer for the second picture group from the resume pointer holding means in order to display anew the picture data item pointed to by the retrieved picture resume pointer. That is, when the operation input designates transition from one picture group to another, the inventive picture displaying apparatus of this structure retains the locations of the picture data items in the picture groups involved, thus improving the user's ease of operation in selecting the desired picture data to be displayed.

Another picture displaying apparatus according to the present invention, as claimed in claim 11 thereof, includes: data holding means for holding a plurality of picture data items; picture resume pointer holding means for holding as a picture resume pointer the location of the picture data item most recently displayed from any of picture groups obtained by sorting the picture data items; picture group resume pointer holding means for holding as a picture group resume pointer the location of the picture group most recently displayed from any of picture group arrays derived from the picture groups; operation inputting means for accepting an operation input for designating any of the picture group arrays, any of the picture groups in the designated picture group array, or any of the picture data items in the designated picture group; displaying means for displaying the picture group arrays, the picture groups in the picture group arrays, or the picture data items in the picture groups; and display controlling means for causing the displaying means to display the designated picture group array, the designated picture group from the designated picture group array, or the designated picture data item from the designated picture group in accordance with the operation input accepted by the operation inputting means; wherein, if the operation input accepted by the operation inputting means designates transition from a first picture group array to a second picture group array, then the display controlling means causes the picture group resume pointer holding means to hold the location of the picture group most recently displayed from the first picture group array as the picture group resume pointer for the first picture group array, while retrieving the picture group resume pointer for the second picture group array from the picture group resume pointer holding means in order to display anew the picture group pointed to by the retrieved picture group resume pointer; and if the operation input accepted by the operation inputting means designates transition from a first picture group to a second picture group, then the display controlling means causes the picture resume pointer holding means to hold the location of the picture data item most recently displayed from the first picture group as the picture resume pointer for the first picture group, while retrieving the picture resume pointer for the second picture group from the picture resume pointer holding means in order to display anew the picture data item pointed to by the retrieved picture resume pointer. That is, if the operation input designates transition from one picture group to another, then the inventive picture displaying apparatus of this structure retains the locations of the picture data items in the picture groups involved; if the operation input designates transition from one picture group array to another, then the inventive apparatus retains the locations of the picture groups in the picture group arrays involved. This improves the user's ease of operation in selecting the desired picture data to be displayed.

According to the present invention, as claimed in claim 12 thereof, there is provided a picture display controlling method for use with a picture display controlling apparatus including data holding means for holding a plurality of picture data items and resume pointer holding means for holding as a picture resume pointer the location of the picture data item most recently displayed from any of picture groups obtained by sorting the picture data items, the picture display controlling method including the steps of: accepting an operation input for designating any of the picture groups or any of the picture data items in the designated picture group; and if the operation input designates transition from a first picture group to a second picture group, then causing the resume pointer holding means to hold the location of the picture data item most recently displayed from the first picture group as the picture resume pointer for the first picture group, while retrieving the picture resume pointer for the second picture group from the resume pointer holding means in order to display anew the picture data item pointed to by the retrieved picture resume pointer. That is, when the operation input designates transition from one picture group to another, the inventive picture display controlling method permits holding of the locations of the picture data items in the picture groups involved, thus improving the user's ease of operation in selecting the desired picture data to be displayed.

According to the present invention, as claimed in claim 13 thereof, there is provided another picture display controlling method for use with a picture display controlling apparatus including data holding means for holding a plurality of picture data items, picture resume pointer holding means for holding as a picture resume pointer the location of the picture data item most recently displayed from any of picture groups obtained by sorting the picture data items, and picture group resume pointer holding means for holding as a picture group resume pointer the location of the picture group most recently displayed from any of picture group arrays derived from the picture groups, the picture display controlling method including the steps of: accepting an operation input for designating any of the picture group arrays, any of the picture groups in the designated picture group array, or any of the picture data items in the designated picture group; if the operation input designates transition from a first picture group array to a second picture group array, then causing the picture group resume pointer holding means to hold the location of the picture group most recently displayed from the first picture group array as the picture group resume pointer for the first picture group array, while retrieving the picture group resume pointer for the second picture group array from the picture group resume pointer holding means in order to display anew the picture group pointed to by the retrieved picture group resume pointer; and if the operation input designates transition from a first picture group to a second picture group, then causing the picture resume pointer holding means to hold the location of the picture data item most recently displayed from the first picture group as the picture resume pointer for the first picture group, while retrieving the picture resume pointer for the second picture group from the picture resume pointer holding means in order to display anew the picture data item pointed to by the retrieved picture resume pointer. That is, if the operation input designates transition from one picture group to another, then the inventive picture display controlling method permits holding of the locations of the picture data items in the picture groups involved; if the operation input designates transition from one picture group array to another, then the inventive method permits holding of the locations of the picture groups in the picture group arrays involved. This improves the user's ease of operation in selecting the desired picture data to be displayed.

According to the present invention, as claimed in claim 14 thereof, there is provided a program for causing a computer to carry out a procedure in conjunction with a picture display controlling apparatus including data holding means for holding a plurality of picture data items and resume pointer holding means for holding as a picture resume pointer the location of the picture data item most recently displayed from any of picture groups obtained by sorting the picture data items, the procedure including the steps of: accepting an operation input for designating any of the picture groups or any of the picture data items in the designated picture group; and if the operation input designates transition from a first picture group to a second picture group, then causing the resume pointer holding means to hold the location of the picture data item most recently displayed from the first picture group as the picture resume pointer for the first picture group, while retrieving the picture resume pointer for the second picture group from the resume pointer holding means in order to display anew the picture data item pointed to by the retrieved picture resume pointer. That is, when the operation input designates transition from one picture group to another, the inventive program permits holding of the locations of the picture data items in the picture groups involved, thus improving the user's ease of operation in selecting the desired picture data to be displayed.

According to the present invention, as claimed in claim 15 thereof, there is provided another program for causing a computer to carry out a procedure in conjunction with a picture display controlling apparatus including data holding means for holding a plurality of picture data items, picture resume pointer holding means for holding as a picture resume pointer the location of the picture data item most recently displayed from any of picture groups obtained by sorting the picture data items, and picture group resume pointer holding means for holding as a picture group resume pointer the location of the picture group most recently displayed from any of picture group arrays derived from the picture groups, the procedure including the steps of: accepting an operation input for designating any of the picture group arrays, any of the picture groups in the designated picture group array, or any of the picture data items in the designated picture group; if the operation input designates transition from a first picture group array to a second picture group array, then causing the picture group resume pointer holding means to hold the location of the picture group most recently displayed from the first picture group array as the picture group resume pointer for the first picture group array, while retrieving the picture group resume pointer for the second picture group array from the picture group resume pointer holding means in order to display anew the picture group pointed to by the retrieved picture group resume pointer; and if the operation input designates transition from a first picture group to a second picture group, then causing the picture resume pointer holding means to hold the location of the picture data item most recently displayed from the first picture group as the picture resume pointer for the first picture group, while retrieving the picture resume pointer for the second picture group from the picture resume pointer holding means in order to display anew the picture data item pointed to by the retrieved picture resume pointer. That is, if the operation input designates transition from one picture group to another, then this inventive program permits holding of the locations of the picture data items in the picture groups involved; if the operation input designates transition from one picture group array to another, then the inventive program permits holding of the locations of the picture groups in the picture group arrays involved. This improves the user's ease of operation in selecting the desired picture data to be displayed.

Through the use of the apparatus, method, or program according to the present invention, as outlined above, the user finds it appreciably easier to select desired pictures for display.

BRIEF DESCRIPTION OF DRAWINGS

FIGS. 2A and 2B are schematic views showing a first picture display example implemented by the embodiment of the present invention;

FIG. 3 is a schematic view showing a second picture display example implemented by the embodiment;

FIGS. 6(a) through 6(e) are schematic views showing a first variation of the second picture display example implemented by the embodiment;

FIGS. 7(a) through 7(e) are schematic views showing a second variation of the second picture display example implemented by the embodiment;

FIGS. 8(a) through 8(e) are schematic views showing a third variation of the second picture display example implemented by the embodiment;

FIGS. 9(a) through 9(e) are schematic views showing a fourth variation of the second picture display example implemented by the embodiment;

FIGS. 10(a) through 10(e) are schematic views showing a fifth variation of the second picture display example implemented by the embodiment;

BEST MODE FOR CARRYING OUT THE INVENTION

Preferred embodiments of the present invention will now be described in detail with reference to the accompanying drawings.

Figure 1:
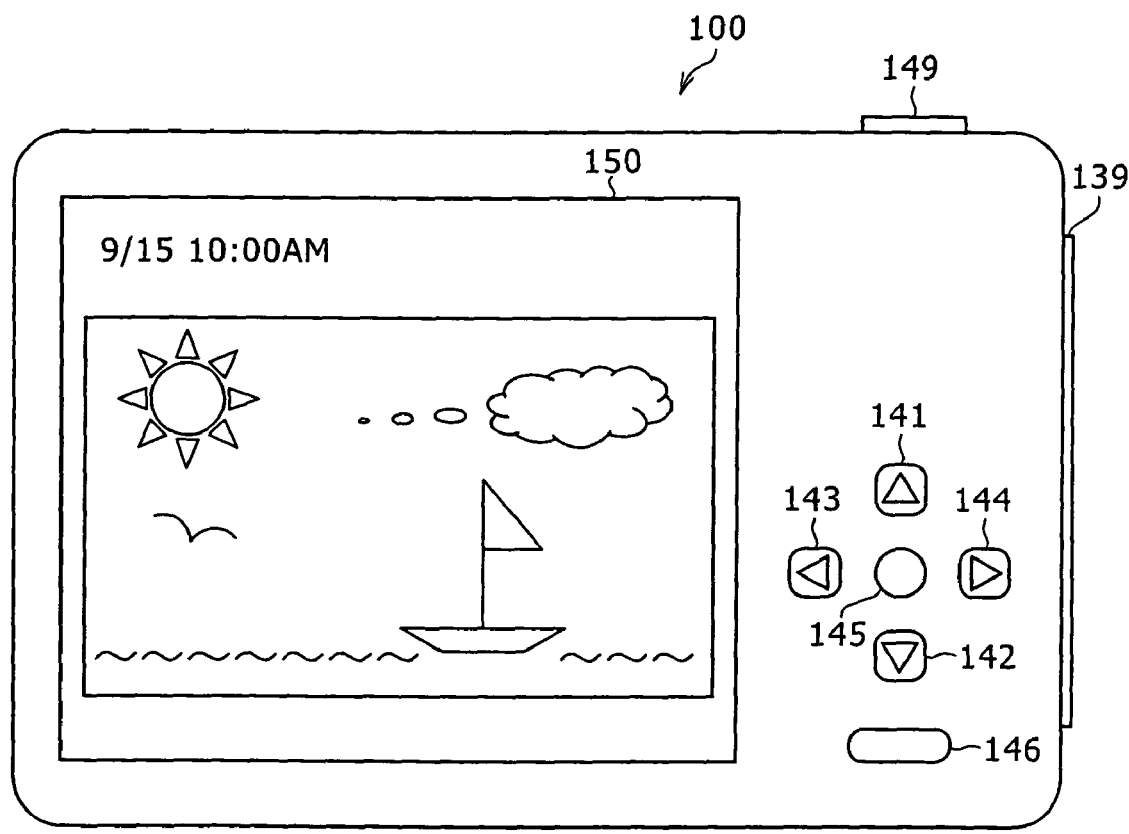
FIG. 1 is a schematic view showing the back of a typical digital camera 100 practiced as a picture display controlling apparatus embodying the present invention.

FIG. 1 schematically shows the back of a typical digital camera 100 practiced as a picture display controlling apparatus embodying the present invention. At the back of the digital camera 100 are an up button 141, a down button 142, a left button 143, a right button 144, an enter button 145, an end button 146, and a picture display unit 150. The up button 141, down button 142, left button 143, and right button 144 are operated by the user designating directions. The enter button 145 is operated to finalize the display item selected on the picture display unit 150. The end button 146 is used to terminate the current screen display and go back to the preceding screen display on the picture display unit 150.

The up button 141, down button 142, left button 143, and right button 144 may be physically implemented either individually as separate buttons or integrally as a four-way rocking switch. These switches or the switch may double as the enter button 145 if designed to have a pushbutton function. The end button 146 may be either a hardware button, or a display item "END" or "BACK" which appears on the picture display unit and which may be selected by operating the enter button 145.

The picture display unit 150 serves to display taken pictures for monitoring or to reproduce recorded pictures. Upon reproduction, the picture display unit 150 offers one of two modes: full-screen display mode in which each picture data item is displayed full-screen, one entire picture at a time; and catalog-like display mode in which a plurality of picture data items are simultaneously displayed in the form of thumbnails. The display modes will be discussed later in more detail.

On the side of the digital camera 100 are a shutter button 149 and an external interface 139. The shutter button 149 (not shown) is actuated to record pictures taken through camera lenses. The external interface 139 is designed to provide connection to an external device. A single-function connector is typically provided. Alternatively, a multi-function connector could be adopted for use with a cradle.

FIGS. 2A and 2B schematically show a first picture display example implemented by the embodiment of the present invention. The first picture display example involves managing picture data items by dividing them into a plurality of picture groups based on particular picture-taking information. For example, picture-taking dates adopted as picture-taking information may be used as the basis for sorting picture data items into picture groups each having the same picture-taking date.

FIG. 2A illustrates how the first picture display example is typically implemented. The picture display unit 150 displays picture-taking dates 151, a picture display 152, and a picture-taking time of day 153 as picture-taking information. On this picture display, the up button 141 or down button 142 is operated to select one of the picture-taking dates 151, while the left button 143 or right button 144 is manipulated to select one of the picture data items applicable to the selected picture-taking date 151. The picture data item thus selected appears as the picture display 152 together with the corresponding picture-taking time of day 153.

In the above example, the picture-taking dates 151 and picture display 152 were shown appearing simultaneously on the same screen. Alternatively, the two may be switched alternately for display on separate screens.

FIG. 2B depicts how picture data items are typically arranged in the first picture display example. Picture data items 550 are shown grouped by the picture-taking date 510 as the picture-taking information. For example, a first picture group having July 28 as the picture-taking date 510 is made up of six picture data items A11 through A16, and a second picture group having September 15 as the picture-taking date 510 is formed by five picture data items A21 through A25.

Picture resume pointers 540 are assigned to the picture groups thus formed. Each picture resume pointer 540 is arranged to hold the location of the picture data item most recently displayed from each of the picture groups. Illustratively, if the picture resume pointer 540 points to 3 for the picture group with July 28 as the picture-taking date 510, that means the picture data item A13 is the item most recently displayed from the picture group in question.

In the first picture display example, one of the picture-taking dates 151 (i.e., representative of a picture group) is selected by operation of the up button 141 or down button 142, and one of the picture data items applicable to one of the picture-taking dates 151 is selected by operation of the left button 143 or right button 144. These operations allow the user to select and display any desired picture data item out of the layout of the picture data items 550 shown in FIG. 2B.

Operating the up or down button 141 or 142 updates the picture resume pointer 540 pointing to the currently selected picture group. For example, suppose that the picture data item A13 is displayed with the picture resume pointer 540 pointing to 3 for the picture group having July 28 as the picture-taking date 510, and that the right button 144 is pushed twice to get the picture data item A15 displayed, followed by the down button 142 pushed once. In that case, the picture resume pointer 540 for the picture group dated July 28 is updated to 5.

In the first picture display example, as described, the picture resume pointer 540 is provided to hold the location of the picture data item most recently displayed from each picture group. This feature makes it possible to resume the same picture display where the user last left off in each picture group after returning from other picture groups having been displayed. That is, there is no need to display repeatedly the picture data items from the beginning in a given picture group every time that picture group is selected. The user can thus switch from one picture group to another for display in an easier and more intuitive manner than before.

FIG. 3 schematically shows a second picture display example implemented by the embodiment. The second picture display example involves managing picture data items by dividing them into a plurality of picture groups based on particular picture-taking information, and arranging the picture groups into picture group arrays on the basis of other picture-taking information.

In this example, location information and picture-taking dates are used as the picture-taking information by which picture data items are sorted into picture groups each having the same location and the same picture-taking date. The picture groups are then sorted by location information into picture group arrays each having the same location. As a result, folders 154 each representing a picture group are laid out two-dimensionally in a matrix in which the folders with the same location information 155 constitute a picture group array.

The folders 154 thus represent picture groups. Illustratively, the top left folder in FIG. 3 represents a picture group made up of 100 picture data items having Fukushima as the location information and July 21 as the picture-taking date. Information useful to the user may be displayed as needed on and around the folder icon. In this example, the picture-taking date, the number of pictures taken, and a thumbnail image of a representative picture in each folder are displayed on that folder icon. Under each folder icon are indications of the location information and the picture-taking time of day of a representative picture in the folder in question. The representative picture may illustratively be the picture data item pointed to by the picture resume pointer for the picture group in question.

Figure 4A:
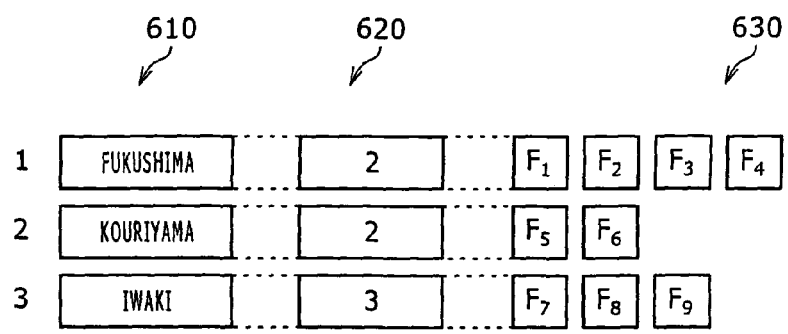
FIGS. 4A and 4B are schematic views showing how picture data items are grouped for the second picture display example implemented by the embodiment.
Figure 4B:
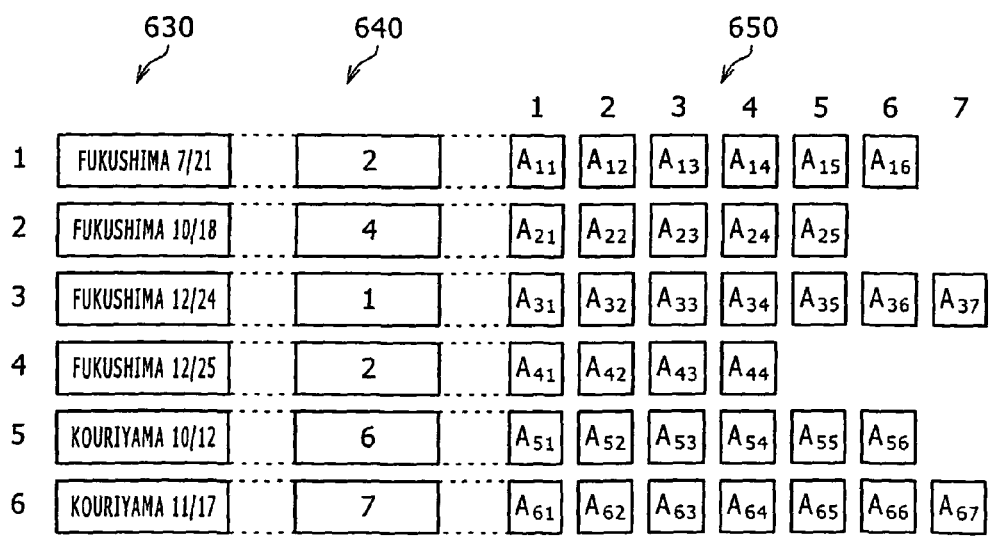

FIGS. 4A and 4B schematically show how picture data items are grouped for the second picture display example implemented by the embodiment. FIG. 4A illustrates how folders 630 representative of picture groups correspond to location information 610. One picture group array is formed by four folders having Fukushima as the location information 610; another picture group array is made up of two folders having Kouriyama as the location information 610; and yet another picture group array is constituted by three folders with Iwaki as the location information 610.

Folder resume pointers 620 are assigned to the picture group arrays. Each folder resume pointer 620 is arranged to hold the location of the picture group most recently used from each of the picture group arrays. Illustratively, if the folder resume pointer 620 points to 2 for the picture group array with Kouriyama as the location information 610, that means the second folder F6 in that picture group array is the picture group most recently displayed.

The folders 630 are assigned serial numbers (i.e., folder numbers) for the sake of convenience. Picture data items 650 are arranged in accordance with these serial numbers as shown in FIG. 4B. Illustratively, FIG. 4B shows that a first picture group having Fukushima as the location information and July 21 as the picture-taking date is made up of six picture data items A11 through A16, and that a second picture data group having Fukushima as the location information and October 18 as the picture-taking date is formed by five picture data items A21 through A25.

Picture resume pointers 640 are assigned to the picture groups. Each picture resume pointer 640 is arranged to hold the location of the picture data item most recently displayed from each of the picture groups. Illustratively, if the picture resume pointer 640 points to 2 for the first picture data group having Fukushima as the location information and July 21 as the picture-taking date, that means the picture data item A12 is the item most recently displayed from the picture group in question.

In the second picture display example, one of the items constituting the location information 155 (i.e., representative of a picture group array) on the folder display screen of FIG. 3 is selected by operation of the up button 141 or down button 142, and one of the picture groups in the picture group array having one of the location information items 155 is selected by operation of the left button 143 or right button 144. These operations allow the user to select and display any desired picture group out of the layout of the folders 630 shown in FIG. 4A.

Operating the up or down button 141 or 142 on the folder display screen updates the folder resume pointer 620 pointing to the currently selected picture group (i.e., folder). For example, suppose that the folder F2 is selected with the folder resume pointer 620 pointing to 2 for the picture group array having Fukushima as the location information 610, and that the right button 144 is pushed twice to select the folder F4, followed by the down button 142 pushed once. In that case, the folder resume pointer 620 for the picture group array with Fukushima as the location information is updated to 4.

After the picture group is selected, one of the picture data items in the selected picture group is selected by operation of the left or right button 143 or 144. Any other picture group may be selected again by operation of the up or down button 141 or 142. These operations allow the user to select and display any desired picture data item from the layout of the picture data items 650 shown in FIG. 4B.

With the above picture display screen displayed, operating the up or down button 141 or 142 updates the picture resume pointer 640 pointing to the currently selected picture group. For example, suppose that the picture data item A12 is displayed with the picture resume pointer 640 pointing to 2 for a first folder (representative of a picture group) having Fukushima as the location information and July 21 as the picture-taking date, and that the right button 144 is pushed three times to get the picture data item A15 displayed, followed by the down button 142 pushed once. In that case, the picture resume pointer 640 for the first folder is updated to 5.

In the second picture display example, as described, the picture resume pointer 640 for holding the location of the picture data item most recently displayed from each picture group is supplemented by the folder resume pointer 620 arranged to hold the location of the folder (representative of a picture group) most recently selected from each picture group array. This feature makes it possible to resume the same picture display where the user last left off in each picture group or in each picture group array after returning from other picture groups or picture group arrays having been displayed. The user can thus switch from one picture group to another or from one picture group array to another for display in an easier and more intuitive manner than before.

Figure 5:
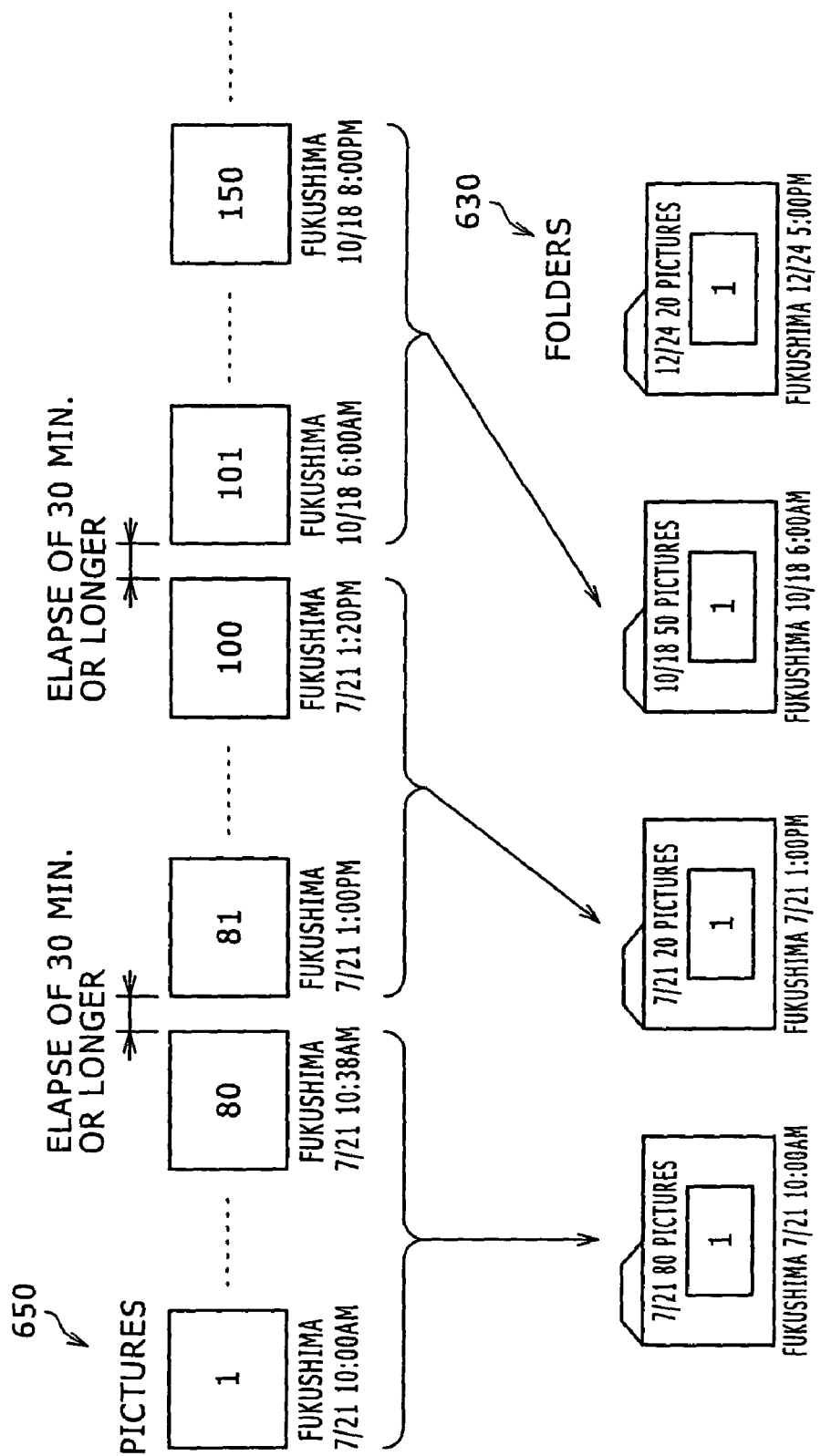
FIG. 5 is a schematic view showing how picture data items are otherwise grouped by the embodiment.

FIG. 5 schematically shows how picture data items are otherwise grouped by the embodiment. In the example of FIG. 3 above, picture groups were shown formed on the basis of location information and picture-taking dates. That is, the picture data items having the same location information and the same picture-taking date are sorted into the same picture group. This, however, is but one example of grouping. Other grouping examples are also conceivable.

Illustratively, as shown in FIG. 5, picture data items may be grouped on the basis of an interval of at least 30 minutes between two consecutive pictures taken. For the example of FIG. 5, it is assumed that a picture-taking session began at 10:00 a.m. on July 21 and continued intermittently in a manner not exceeding an elapse of 30 minutes between any two pictures taken successively, until 80 pictures were taken in all to form a single group. The eighty-first picture is shown taken at 1:20 p.m. on July 21 followed by the successively taken pictures, which are sorted into a different group.

In this manner, adopting an appropriate grouping criterion makes it possible to arrange into the same group those picture data items that are considered closely related to one another.

FIGS. 6(*a*) through 6(*e*) are schematic views showing a first variation of the second picture display example implemented by the embodiment. With this variation, as shown in FIG. 6(*a*), it is assumed that on the folder display screen, a folder having Fukushima as the location information and October 18 as the picture-taking date is selected. In this display example, the selected folder is shown enlarged while the other folder icons appear reduced in size. This is an effective way of highlighting the selected folder on a small-size screen such as those of portable devices. Obviously, all folders may be displayed in the same size as shown in FIG. 3 if so desired. The same goes for the examples of FIGS. 7(*a*) through 10(*e*) that follow.

Pushing the enter button 145 finalizes selection of the highlighted folder. This action displays a fourth picture data item pointed to by the picture resume pointer as shown in FIG. 6(*b*). On this picture data display screen, pushing the right button 144 causes the next (i.e., fifth) picture data item to be displayed as illustrated in FIG. 6(*c*). Then again pushing the right button 144 causes the next (i.e., sixth) picture data item to appear as indicated in FIG. 6(*d*).

Pushing the end button 146 at this point causes the folder display to appear as depicted in FIG. 6(*e*). On this display, the picture resume pointer for the folder having Fukushima as the location information and October 18 as the picture-taking date is updated to point to the sixth picture data item.

FIG. 7(*a*) through 7(*e*) schematically show a second variation of the second picture display example implemented by the embodiment. As shown in FIG. 7(*a*), it is assumed here that on the folder display screen, a folder having Fukushima as the location information and October 18 as the picture-taking date is selectively highlighted.

Pushing the enter button 145 finalizes selection of the highlighted folder. This action displays a 48th picture data item pointed to by the picture resume pointer as shown in FIG. 7(*b*). On this picture data display screen, pushing the right button 144 causes the next (i.e., 49th) picture data item to appear as illustrated in FIG. 7(*c*). Then again pushing the right button 144 causes the next (i.e., 50th) picture data item to be displayed as indicated in FIG. 7(*d*).

Again pushing the right button 144 at this point causes the folder display such as that of FIG. 7(*e*) to appear on which the next folder having Fukushima as the location information and December 24 as the picture-taking date is selected. On this display, the picture resume pointer for the folder having Fukushima as the location information and October 18 as the picture-taking date is updated to point to the last (i.e., 50th) picture data item. In FIG. 7(*e*), the selected folder is shown scrolled to come to the approximate center of the picture display unit 150. This is another effective way of highlighting the selected folder on a small-size screen such as those of portable devices. Obviously, all folders may be displayed in an evenly distributed manner if so desired.

FIGS. 8(*a*) through 8(*e*) schematically show a third variation of the second picture display example implemented by the embodiment. As shown in FIG. 8(*a*), it is assumed here that on the folder display screen, a folder having Fukushima as the location information and October 18 as the picture-taking date is selectively highlighted.

Pushing the enter button 145 finalizes selection of the highlighted folder. This action displays a 50th picture data item pointed to by the picture resume pointer as shown in FIG. 8(*b*). On this picture data display screen, unlike the second variation above, pushing the right button 144 displays the first picture data item from the next folder having Fukushima as the location information and December 24 as the picture-taking date, as illustrated in FIG. 8(*c*).

Then again pushing the right button 144 causes the next (i.e., second) picture data item to be displayed as indicated in FIG. 8(*d*). Pushing the end button 146 at this point causes the folder display to appear as depicted in FIG. 8E. On this display, the picture resume pointer for the folder having Fukushima as the location information and October 18 as the picture-taking date is updated to point to the last (i.e., 50th) picture data item.

FIGS. 9(*a*) through 9(*e*) schematically show a fourth variation of the second picture display example implemented by the embodiment. As shown in FIG. 9(*a*), it is assumed here that on the folder display screen, a folder having Fukushima as the location information and December 24 as the picture-taking date is selectively highlighted.

Pushing the enter button 145 finalizes selection of the highlighted folder. This action displays a third picture data item pointed to by the picture resume pointer as shown in FIG. 9(*b*). On this picture data display screen, pushing the right button 144 causes the next (i.e., fourth) picture data item to appear as indicated in FIG. 9(*c*). Again pushing the right button 144 causes the next (i.e., fifth) picture data item to be displayed as illustrated in FIG. 9(*d*).

Pushing the down button 142 at this point causes the folder display such as that of FIG. 9E to appear on which a folder having Kouriyama as the location information and November 17 as the picture-taking date is selected as pointed to by the folder resume pointer in the picture group array immediately downward. On this display, the picture resume pointer for the folder having Fukushima as the location information and December 24 as the picture-taking date is updated to point to the fifth picture data item.

FIGS. 10(*a*) through 10(*e*) schematically show a fifth variation of the second picture display example implemented by the embodiment. As shown in FIG. 10(*a*), it is assumed here that on the folder display screen, a folder having Fukushima as the location information and December 24 as the picture-taking date is selectively highlighted.

Pushing the enter button 145 finalizes selection of the highlighted folder. This action displays a third picture data item pointed to by the picture resume pointer as shown in FIG. 10(*b*). On this picture data display screen, unlike the fourth variation above, pushing the down button 142 displays the seventh picture data item from the folder which has Fukushima as the location information and November 17 as the picture-taking date and which is pointed to by the folder resume pointer in the picture group array immediately downward, as illustrated in FIG. 10(*c*).

Then pushing the right button 144 causes the next (i.e., eighth) picture data item to appear as indicated in FIG. 10(*d*). Pushing the end button 146 at this point causes the folder display to appear as depicted in FIG. 10(*e*). On this display, the picture resume pointer for the folder having Kouriyama as the location information and November 17 as the picture-taking date is updated to point to the eighth picture data item.

Figure 11:
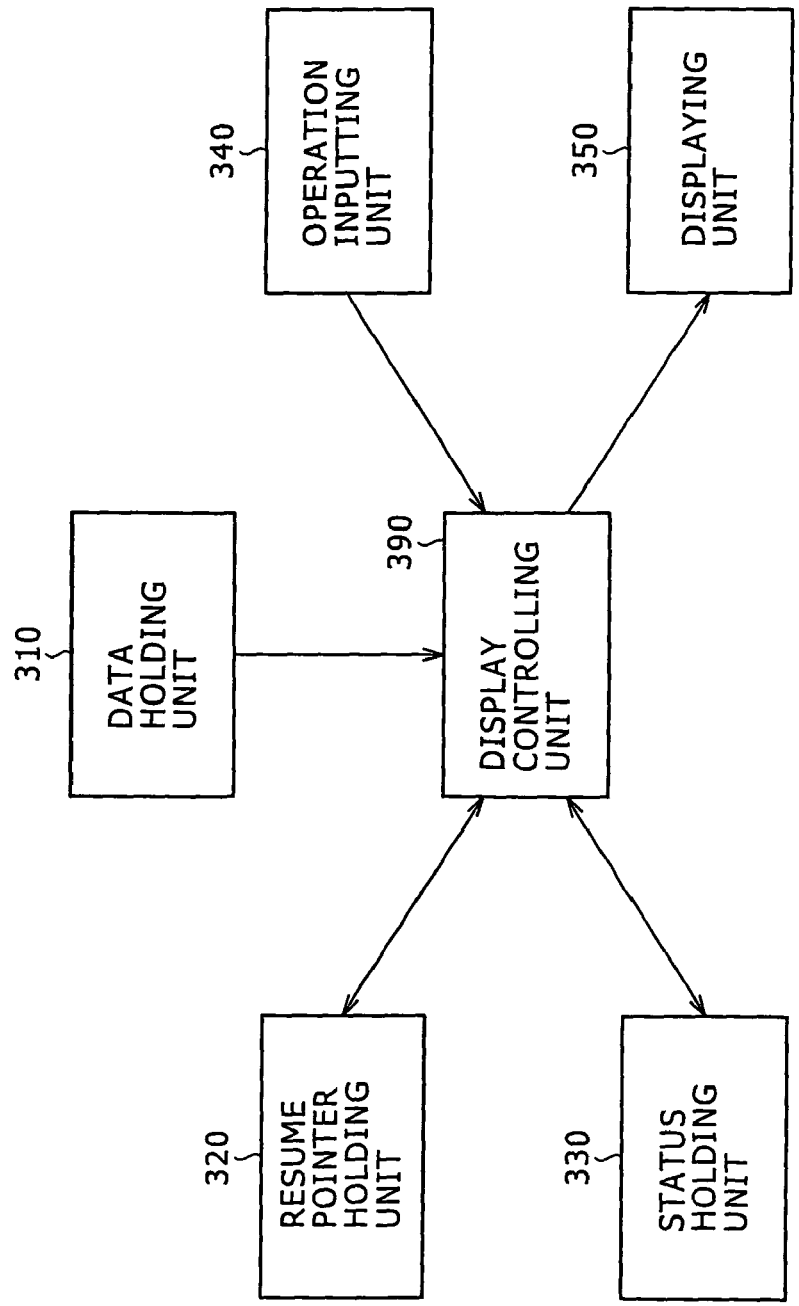
FIG. 11 is a schematic view showing a typical structure of the picture display controlling apparatus embodying the present invention.

FIG. 11 schematically shows a typical structure of the picture display controlling apparatus embodying the present invention. This picture display controlling apparatus includes a data holding unit 310, a resume pointer holding unit 320, a status holding unit 330, an operation inputting unit 340, a displaying unit 350, and a display controlling unit 390.

The data holding unit 310 holds the picture data to be displayed. The picture data being held is illustratively made up of the picture data items 550 shown in FIG. 2B or the picture data items 650 in FIG. 4B.

The resume pointer holding unit 320 holds the resume pointers that are needed for display purposes. Illustratively, the resume pointers include the picture resume pointer 540 shown in FIG. 2B, folder resume pointer 620 in FIG. 4A, and picture resume pointer 640 in FIG. 4B.

The status holding unit 330 holds the current display status. The status corresponds illustratively to the information about the folder being selected. In the case of the picture display shown in FIG. 6(*b*), the information about the picture being displayed constitutes the current display status.

The operation inputting unit 340 admits the user's operation input and forwards it to the display controlling unit 390. For example, the operation inputting unit 340 is constituted by the up, down, left, and right buttons 141 through 144, enter button 145, and end button 146. The displaying unit 350 presents the user with displays. Illustratively, the displaying unit 350 corresponds to the picture display unit 150 shown in FIG. 1.

Given an operation input from the operation inputting unit 340, the display controlling unit 390 exercises control in a manner causing the displaying unit 350 to display the picture data held in the data holding unit 310. In exerting such display control, the display controlling unit 390 grasps the current display status by referencing the status holding unit 330, and updates what is held in the status holding unit 330 in keeping with any transition in display status.

If transition is made from picture group to another for picture data display, the display controlling unit 390 updates the picture resume pointer for the old picture group and references the picture resume pointer for the new picture group. If transition is made from one picture group array to another for the selection of a picture group, the display controlling unit 390 updates the folder resume pointer for the old picture group array and references the folder resume pointer for the new picture group array.

Figure 12:
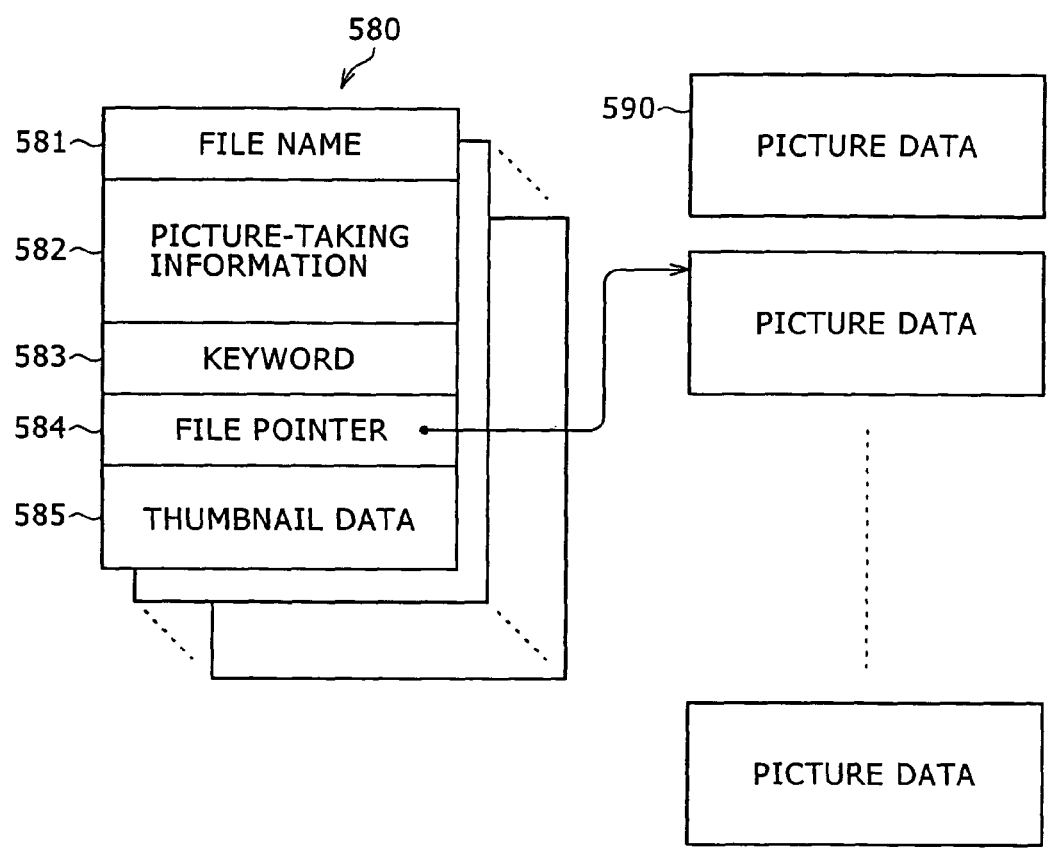
FIG. 12 is a schematic view showing a typical structure of picture data items for use by the embodiment of the present invention.

FIG. 12 schematically shows a typical structure of picture data items for use by the embodiment of the present invention. Each picture data item held in the data holding unit 310 is illustratively made up of actual picture data 590 and recording information 580 about that picture data 590. The recording information 580 includes a file name 581, picture-taking information 582, a keyword 583, a file pointer 584, and thumbnail data 585.

The file name 581 holds the name of the file containing the corresponding picture data 590. The picture-taking information 582 holds information in effect when the corresponding picture data 590 was picked up. The keyword 583 holds a given keyword with regard to the corresponding picture data 590. The file pointer 584 holds that location on the recording medium in which the corresponding picture data 590 is stored. The thumbnail data 585 holds the data constituting a thumbnail image of the corresponding picture data 590.

The picture-taking information 582 may illustratively cover location information, a picture-taking date, camera information, and a picture-taking person. The location information may be acquired by searching through a suitable database in accordance with the longitude and latitude derived from GPS (Global Positioning System). The picture-taking date may be obtained from an internal clock circuit of the digital camera or the like. The camera information includes picture-taking settings acquired from inside the camera, such as the f-number, exposure time, exposure program, exposure correction value, AGC gain value, minimum lens F value, flash, lens focus distance, white balance, picture-taking scene type, focus mode, camera-to-subject distance, camera shake correction and correction limitation thereof, digital zoom magnification, photo with effects, and vendor name. If the digital camera is shared by a plurality of users, then the picture-taking person may be identified using his or her registered name or by recording the e-mail address of a message received along with the picture attached to that message.

The picture-taking information 582 composed of the above-described pieces of information is used as the basis for sorting pictures into groups. For example, if the white balance is not found set for auto, it could signify that the user has a particular feeling about the scene in question, taken as a picture. If the camera shake correction is found in excess of its threshold value, the corresponding picture may well be so corrupted that the user is unlikely to take the trouble to enter a keyword. The vendor name identifying the digital camera in use serves to determine whether a given picture has been taken by that digital camera or acquired from the outside.

Where the actual picture data 590 is handled independently of the recording information 580 about that data 590 as shown in FIG. 12, it is possible to practice the embodiment of the present invention by simply gaining access to the recording information 580. That is, the seek time required to access the actual picture data 590 is eliminated. Alternatively, it is also possible to practice the embodiment by handling a management file and actual data in a single file format such as the existing Exif (EXchangeable Image File Format).

It should be noted that as shown in FIG. 12, the thumbnail data 585 is retained as a part of the recording information 585 and independently of the picture data. This structure eliminates the time required to generate a thumbnail image from the original picture every time a thumbnail display is needed.

Figure 13:
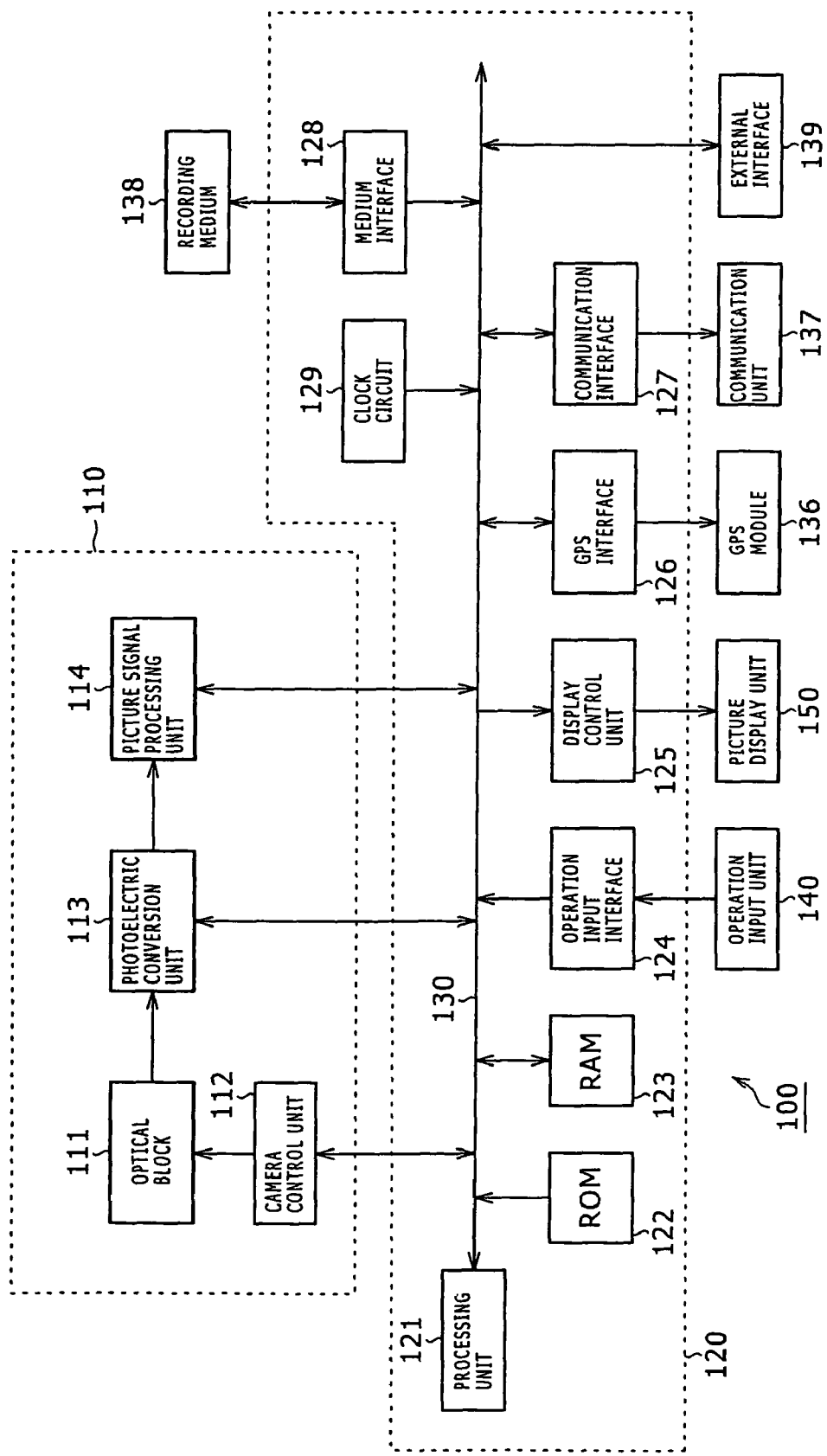
FIG. 13 is a block diagram showing a typical structure of the digital camera 100 practiced as the picture display controlling apparatus embodying the present invention.

FIG. 13 is a block diagram showing a typical structure of the digital camera 100 practiced as the picture display controlling apparatus embodying the present invention. The digital camera 100 has a camera device 110, a control device 120, an operation input unit 140, the picture display unit 150, a GPS module 136, a communication unit 137, a recording medium 138, and an external interface 139. The camera device 110 serves to take pictures and generate picture data accordingly. The control device 120 causes the camera device 110 to record the generated picture data to the recording medium 138. The picture data is recorded as files on the recording medium 138.

The camera device 110 includes an optical block 111, a camera control unit 112, a photoelectric conversion unit 113, and a picture signal processing unit 114. The optical block 111 incorporates a set of lenses for taking pictures of the subject, an aperture adjusting mechanism, a focusing mechanism, a zooming mechanism, a shutter mechanism, a flash mechanism, and a camera shake correcting mechanism. Given control signals from the control device 120, the camera control unit 112 generates control signals destined for the optical block 111. The camera control unit 112 supplies the generated control signals to the optical block 111 for zoom control, shutter control, and exposure control.

The photoelectric conversion unit 113 is constituted illustratively by an image pickup device such as CCD (charge coupled device). An image produced by the optical block 111 is formed on an image-forming plane of the photoelectric conversion unit 113. Upon receipt of a picture-taking timing signal from the control device 120 in response to the user's shutter operation, the photoelectric conversion unit 113 converts the image of the subject on the image-forming plane into a picture signal. Following the conversion, the picture signal is fed to the picture signal processing unit 114.

Given control signals from the control device 120, the picture signal processing unit 114 carries out such processes as gamma correction and AGC (auto gain control) on the picture signal and converts the received picture signal into a digital picture signal.

The control device 120 is made up of a processing unit 121, a ROM (read only memory) 122, a RAM (random access memory) 123, an operation input interface 124, a display control unit 125, a GPS interface 126, a communication interface 127, a medium interface 128, and a clock circuit 129, all interconnected by a system bus 130.

The processing unit 121 provides overall control of the control unit 120 and utilizes the RAM 123 as a work area. The ROM 122 retains programs for controlling the camera device 110 as well as programs for controlling the recording and reproduction of picture signals. These programs enable the display controlling unit 390 in FIG. 11 to be embodied as the control device 120. The resume pointer holding unit 320 and status holding unit 330 in FIG. 11 are embodied as the RAM 123.

The operation input unit 140 is connected to the operation input interface 124. The operation input unit 140 may illustratively include the up, down, left and right buttons 141 through 144, the enter button 145, and the end button 146 shown in FIG. 1, as well as a plurality of keys such as a mode switching key (for switching to picture-taking mode, reproduction mode, etc.), a zooming adjusting key, an exposure adjusting key, and a shutter key. The processing unit 121 checks to determine which of the keys is being operated on the operation input unit 140 and carries out a control process corresponding to the result of the check.

The picture display unit 150 is connected to the display control unit 125. The picture display unit 150 serves to display pictures and menus, and is implemented illustratively using an LCD (liquid crystal display).

The GPS module 136 is connected to the GPS interface 126. The GPS modules 136 is a system that checks the current location using satellites. The location information acquired by the GPS module 136 is used as part of the above-described picture-taking information.

The communication unit 137 is connected to the communication interface 127. The communication unit 137 communicates with another apparatus and sends and receives data including moving picture data to and from that apparatus. The communication Unit 137 is constituted by a radio frequency (RF) unit, an intermediate frequency (IF) unit, and an analog-digital (A/D) conversion unit, not shown.

The recording medium 138 is loaded into the medium interface 128. The clock circuit 129 is a circuit that generates the time of day for use as part of the picture-taking information discussed above.

What was explained above is a typical structure of the digital camera 100 practiced as the picture display controlling apparatus. However, this is not limitative of the present invention. In addition to the digital camera 100, the invention applies to diverse types of picture display controlling apparatus such as portable devices.

Figure 14:
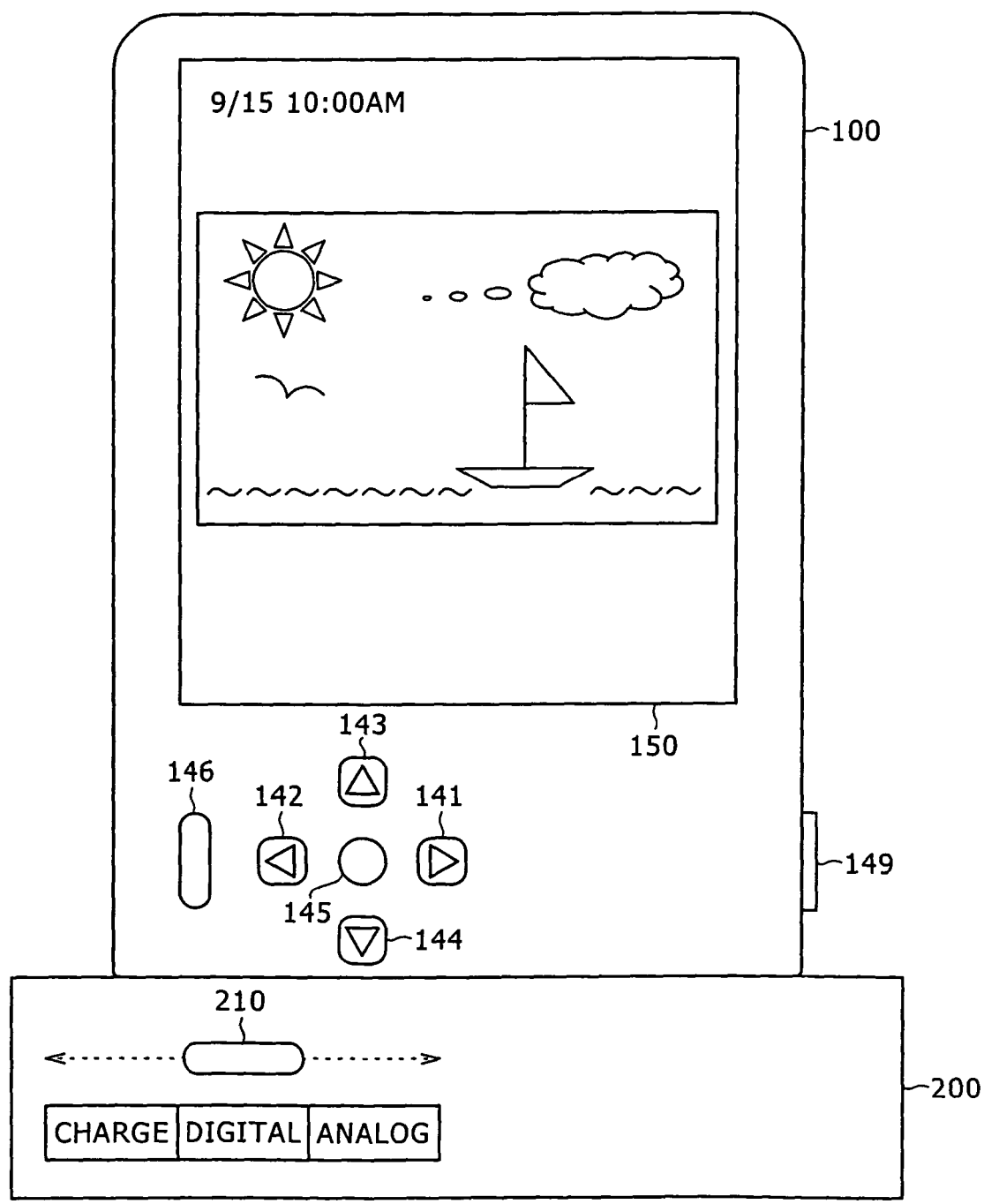
FIG. 14 is a schematic view showing how the digital camera 100 embodying the invention is set on a cradle 200.

FIG. 14 schematically shows how the digital camera 100 embodying the invention is set on a cradle 200. The cradle 200 is a stand-like device that expands the functionality of the digital camera 100 when the latter is mounted on it. Since there has been a growing demand for the digital camera 100 to be smaller in size in recent years, the camera 100 often has its input and output terminals located on the side that connects to the cradle 200.

The function of the cradle 200 is selected by operation of a switch 210 furnished on it. When the switch 210 is set to the "CHARGE" position with the digital camera 100 set on the cradle 200, the camera is recharged. When the switch 210 is set to the "DIGITAL" position, the digital camera 100 is enabled to have connection with a digital input/output bus such as USB (universal serial bus). This connection allows selected pictures to be sent to a printer or a computer via the digital input/output bus. When the switch 210 is set to the "ANALOG" position, the digital camera 100 is enabled to establish connection with an analog input/output line. The connection allows the digital camera 100 illustratively to acquire analog video signals from the outside.

When the digital camera 100 is mounted on the cradle 200, the external interface 139 of the camera 100 is coupled to a connector (not shown) of the cradle 200. In order to minimize the area occupied by the cradle 200, the external interface 139 of the digital camera 100 is located on one of its narrower sides. That is, the digital camera 100, usually operated in horizontally oriented fashion as shown in FIG. 1, is mounted on the cradle 200 in the upright position as illustrated in FIG. 14. If the picture display unit 150 showed pictures in the original display orientation when mounted on the cradle 200, it would be difficult for the user to view what is being displayed. In such a case, it will be more convenient if the display orientation is rotated by 90 degrees along with the assigned functions of the up, down, left and right buttons 141 through 144.

That feature is implemented by having the display orientation of the picture display unit 150 rotated by 90 degrees counterclockwise when the connection of the digital camera 100 to the cradle 200 is recognized. The feature allows displayed pictures and picture-taking date indications to agree with the user's light of sight. In addition, the functions assigned to the buttons are shifted so that the button 143 will function as the up button, button 144 as the down button, button 142 as the left button, and button 141 as the right button.

In the above setup, the digital cameral 100 is mounted in the upright position on the cradle 200 in order to minimize the area occupied by the latter. With the up, down, left and right buttons 141 through 144 of the digital camera 100 changed in their functions and thus made usable in an intuitively comprehensible manner, it is possible to minimize any additional buttons or controls on the cradle 200.

Described below with reference to the relevant drawings is how the picture display controlling apparatus embodying the present invention typically operates.

Figure 15:
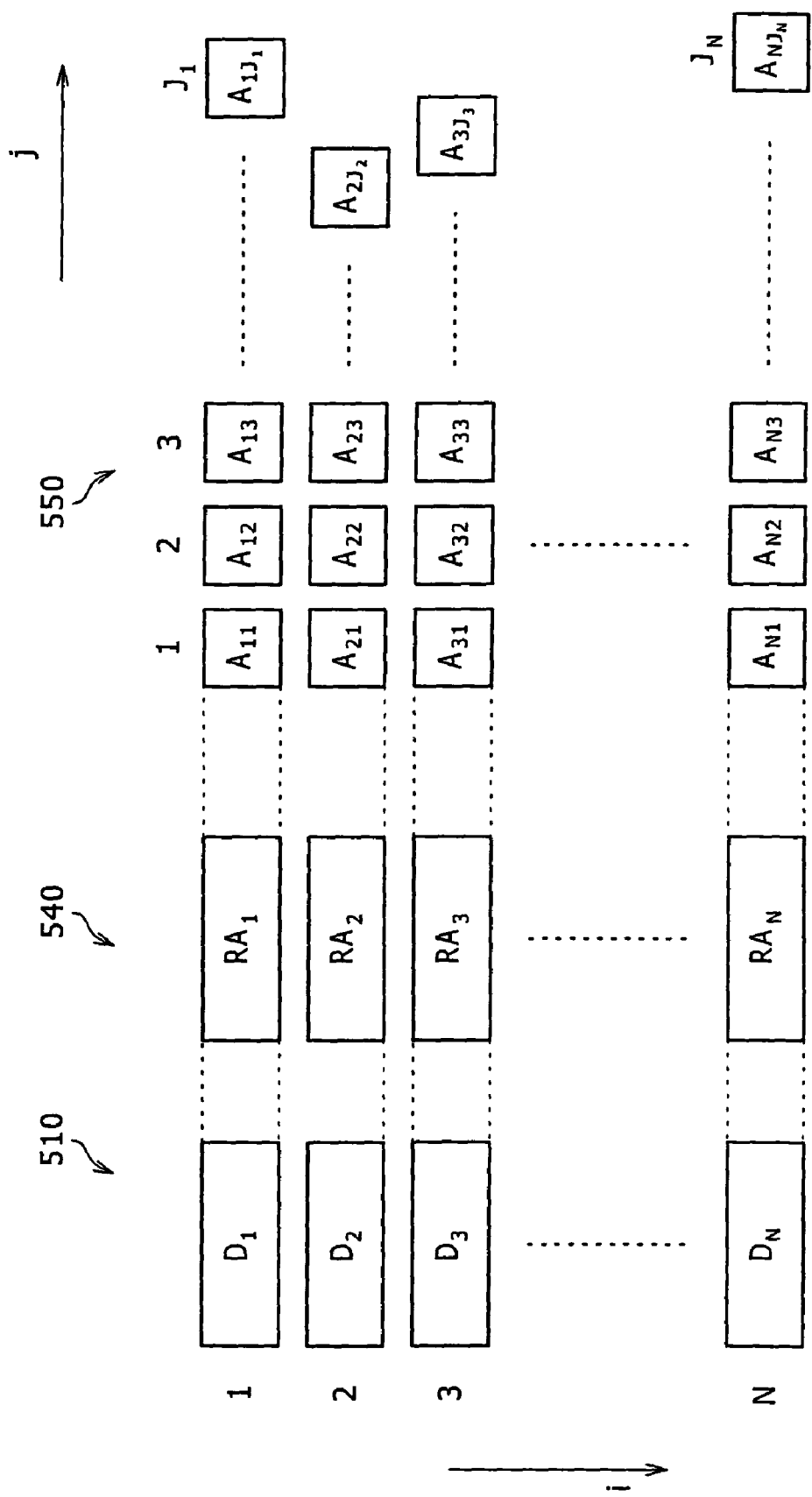
FIG. 15 is a schematic view showing a typical data structure for use with the first picture display example implemented by the embodiment of the present invention.

FIG. 15 schematically shows a typical data structure for use with the first picture display example implemented by the embodiment of the present invention. In this case, picture-taking dates 510 are used as the picture-taking information for grouping purposes. That is, the picture data items having the same picture-taking date 510 are sorted into the same group.

It is assumed here that there are as many as N picture-taking dates $D_1$ through $D_N$ each represented by index variable i. That is, the i-th picture-taking date 510 is denoted by $D_i$. It is also assumed that there are as many as $J_i$ picture data items 550, each represented by index variable j, which belong to the i-th picture group. On that assumption, the j-th picture data item 550 belonging to the i-th picture group is denoted by $A_{ij}$.

Each picture group is assigned the picture resume pointer 540. The picture resume pointer 540 points to the location of the picture data item 550 most recently displayed from the i-th picture group, the location being represented by $RA_i$.

Figure 16:
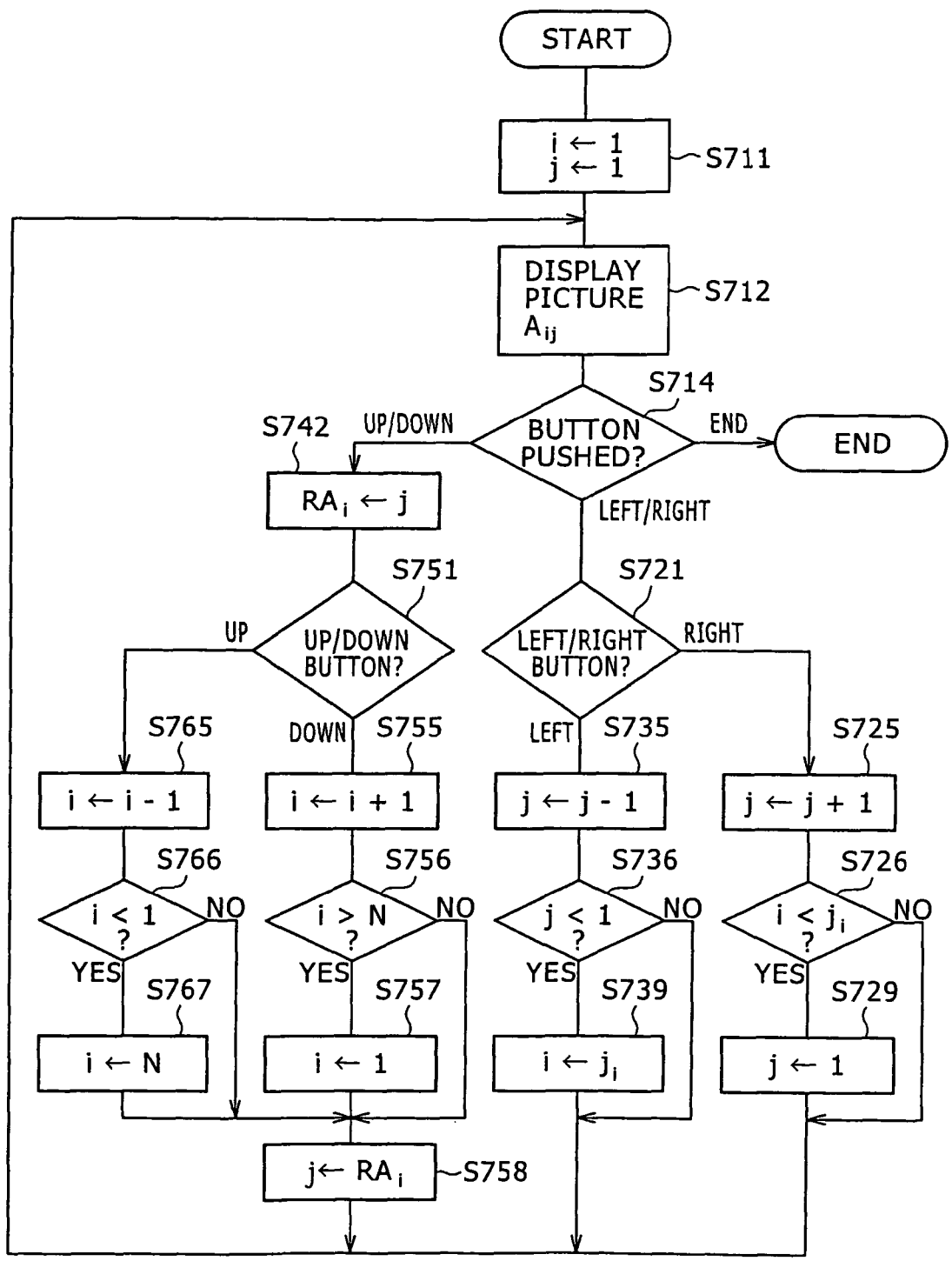
FIG. 16 is a flowchart of steps in which the first picture display example is implemented by the embodiment.

FIG. 16 is a flowchart of steps in which the first picture display example is implemented by the embodiment. The index variables i and j are initialized to 1 each (step S711). This causes the first picture data item $A_{11}$ to be displayed as a picture data item $A_{ij}$ (step S712). Pushing the end button 146 at this point terminates the picture data display (step S714).

With the picture data item $A_{ij}$ displayed, pushing the right button 144 (step S721) increments the index variable j by 1 within the picture group (step S725). If at this point the index variable j is found larger than the largest picture data item number $J_i$ within the i-th picture group (step S726), then the index variable j is set to 1, the smallest value (step S729). That is, repeatedly pushing the right button 144 causes the picture data items to be displayed cyclically within the same picture group.

With the picture data item $A_{ij}$ displayed, pushing the left button 143 (step S721) decrements the index variable j by 1 within the picture group (step S735). If at this point the index variable j is found smaller than the smallest picture data item number 1 within the i-th picture group (step S736), then the index variable j is set to the largest number $J_i$ (step S739). That is, repeatedly pushing the left button 143 also causes the picture data items to be displayed cyclically within the same picture group.

With the picture data item $A_{ij}$ displayed, pushing the up button 141 or down button 142 (step S714) causes the index variable j for the currently displayed picture data item to be retained as the picture resume pointer for the i-th picture group (step S742). If the up button 141 is pushed (step S751), the index variable i denoting the picture group is decremented by 1 (step S765). If at this point the index variable i is found smaller than the smallest picture group number 1 (step S766), the index variable i is set to the largest picture group number N (step S767). That is, repeatedly pushing the up button 141 causes the picture groups to be displayed cyclically.

If the down button 142 is pushed (step S751), the index variable i denoting the picture group is incremented by 1 (step S755). If at this point the index variable i is found larger than the largest picture group number N (step S756), the index variable i is set to the smallest number 1 (step S757). That is, repeatedly pushing the down button 142 also causes the picture groups to be displayed cyclically.

When either of the up and down buttons 141 and 142 is pushed, the picture resume pointer for the new picture group is set as the index variable j for the new picture data item (step S758).

Then pushing any one of the up, down, left and right buttons 141 through 144 causes the next picture data item $A_{ij}$) to be displayed (step S712).

In the example of FIG. 16 above, it was assumed that pushing the left or right button 143 or 144 causes the picture data items to be displayed cyclically within the same picture group. Alternatively, picture data items may be displayed across picture groups, as explained below.

Figure 17:
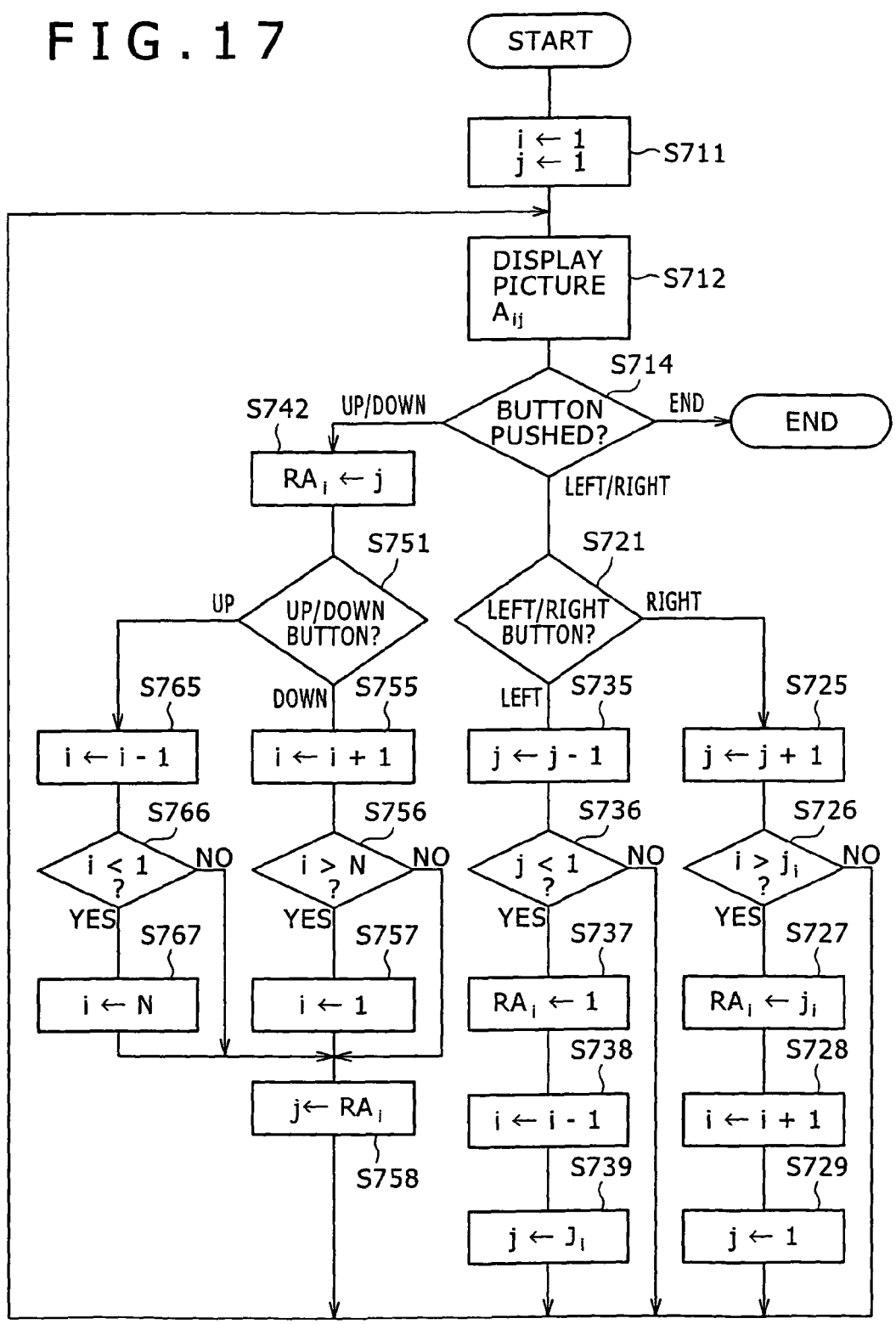
FIG. 17 is a flowchart of other steps in which the first picture display example is implemented by the embodiment.

FIG. 17 is a flowchart of other steps in which the first picture display example is implemented by the embodiment. The procedure shown in FIG. 17 is basically the same as that in FIG. 16 except that the index variable j is updated in a different manner when the left or right button 143 or 144 is pushed. The procedure is carried out as follows:

With the picture data item Aij displayed, pushing the right button 144 (step S721) increments the index variable j by 1 within the picture group (step S725). If at this point the index variable j is found larger than the largest picture data item number Ji within the i-th picture group (step S726), that largest number Ji is retained as the picture resume pointer for the i-th picture group (step S727). When the index variable i denoting the picture group is incremented by 1 (step S728), the index variable j for the new picture group is set to 1 (step S729). That is, when the right button 144 is pushed for a forward transition from the last picture data item within the current picture group to a picture data item beyond, the first picture data item in the next picture group is displayed.

With the picture data item Aij displayed, pushing the left button 143 (step S721) decrements the index variable j by 1 within the picture group (step S735). If at this point the index variable j is found smaller than the smallest picture data item number 1 within the i-th picture group (step S736), the smallest number 1 is retained as the picture resume pointer for the i-th picture group (step S737). The index variable i denoting the picture group is decremented by 1 (step S738), and the largest picture data item number $J_i$ within the i-th picture group is established as the index variable j for the new picture data item (step S739). That is, when the left button 143 is pushed for a backward transition from the first picture data item in the current picture group to a picture data item beyond, the last picture data in the preceding picture group is displayed.

Figure 18A:
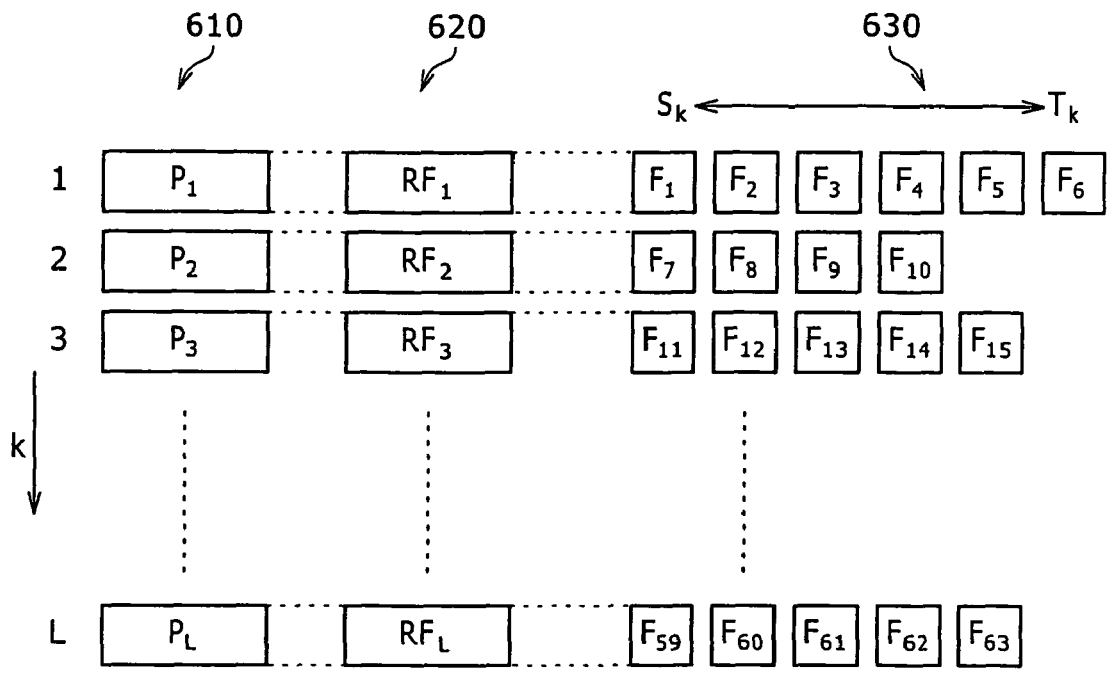
FIGS. 18A and 18B are schematic views showing a typical data structure for use with the second picture display example implemented by the embodiment.
Figure 18B:
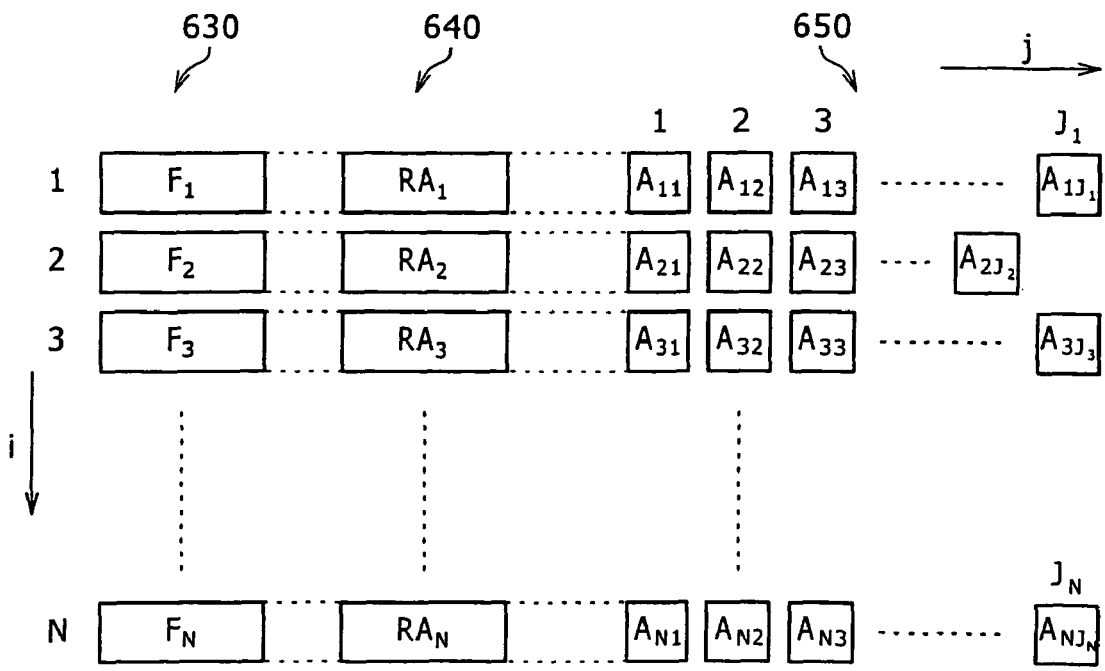

FIGS. 18A and 18B are schematic views showing a typical data structure for use with the second picture display example implemented by the embodiment. It is assumed here that the location information 610 and picture-taking dates are used as typical picture-taking information. Accordingly, the picture data items sharing the same location information 610 and the same picture-taking date are sorted into the same picture group. Furthermore, the picture data groups sharing the same location information 610 are sorted into the same picture group array.

More specifically, as shown in FIG. 18A, folders 630 are sorted into picture group arrays based on the location information 610. It is assumed here that there are as many as L pieces of location information 610 $P_1$ through $P_L$, and that with index variable k in use, a k-th piece of location information 610 is denoted by $P_k$. The folders 630 are assigned serial numbers as folder numbers.

The smallest of the folder numbers of the folders belonging to the k-th picture group array is denoted by $S_k$ and the largest by $T_k$. In this example, the smallest folder number $S_2$ for the folders belonging to the second picture group array is 7 and the largest $T_2$ is 10.

Each picture group array is assigned the folder resume pointer 620. The folder resume pointer 620 points to the location of the folder 630 most recently selected from the k-th picture group array, the location being denoted by $RF_k$.

In FIG. 18B, it is assumed that there are as many as N folders 630 $F_1$ through $F_N$; that with index variable i in use, an i-th folder 630 is denoted by Fi; and that with index variable j in use, there are as many as Ji picture data items 650 belonging to the i-th picture group. On that assumption, the j-th picture data item 650 belonging to the i-th picture group is denoted by $A_{ij}$.

Each picture group is assigned the picture resume pointer 640. The resume pointer 640 points to the location of the picture data item 650 most recently displayed from the i-th picture group, the location being denoted by $RA_i$.

Figure 19:
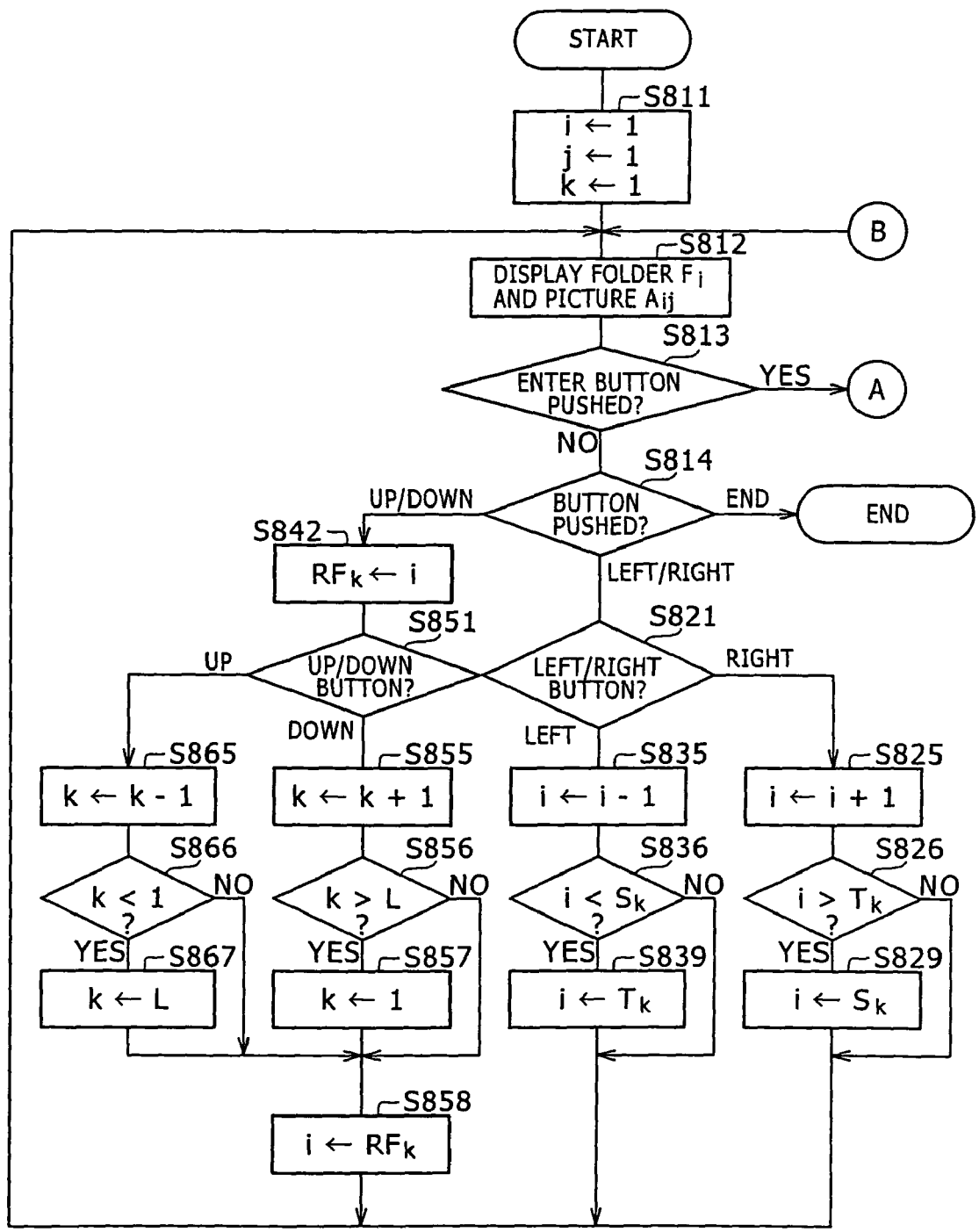
FIG. 19 is a flowchart of steps in which folders are displayed in the second picture display example implemented by the embodiment.

FIG. 19 is a flowchart of steps in which folders are displayed in the second picture display example implemented by the embodiment. The index variables i, j and k are first initialized to 1 each (step S811). A screen display such as that in FIG. 6(*a*) appears indicating that the folder $F_i$ is selected, with a thumbnail $A_{ij}$ of the selected folder displayed simultaneously as the representative picture (step S812). Pushing the enter button 145 at this point effects transition to the picture display screen (step S813). Pushing the end button 146 terminates the picture data display (step S814).

With the folder $F_i$ selected, pushing the right button 144 (step S821) increments the index variable i by 1 for the picture group (step S825). If at this point the index variable i is found larger than the largest folder number $T_k$ for the k-th picture group array (step S826), then the index variable i is set to the smallest number $S_k$ (step S829). That is, repeatedly pushing the right button 144 on the folder display screen in effect displays the folders cyclically in the same picture group array.

With the folder $F_i$ selected, pushing the left button 143 (step S821) decrements the index variable i by 1 for the picture group (step S835). If at this point the index variable i is found smaller than the smallest folder number $S_k$ for the k-th picture group array (step S836), then the index variable i is set to the largest number $T_k$ (step S839). That is, repeatedly pushing the left button 143 on the folder display screen in effect also displays the folders cyclically in the same picture group array.

With the folder $F_i$ displayed, pushing the up button 141 or down button 142 (step S814) causes the index variable i for the currently displayed folder to be retained as the folder resume pointer for the k-th picture group array (step S842). If the up button 141 is pushed (step S851), the index variable k denoting the picture group array is decremented by 1 (step S865). If at this point the index variable k is found smaller than the smallest picture group array number 1 (step S866), the index variable k is set to the largest number L (step S867). That is, repeatedly pushing the up button 141 causes the picture group arrays to be displayed cyclically.

If the down button 142 is pushed (step S851), the index variable k denoting the picture group array is incremented by 1 (step S855). If at this point the index variable k is found larger than the largest picture group array number L (step S856), the index variable k is set to the smallest number 1 (step S857). That is, repeatedly pushing the down button 142 also causes the picture group arrays to be displayed cyclically.

When either of the up and down buttons 141 and 142 is pushed, the folder resume pointer for the new picture group array is set as the index variable i for the new picture data item (step S858).

Then pushing any one of the up, down, left and right buttons 141 through 144 causes the next folder $F_i$ to be displayed (step S812).

In the example of FIG. 19 above, it was assumed that pushing the left or right button 143 or 144 causes the folders to be displayed cyclically within the same picture group array. Alternatively, folders may be displayed across picture group arrays, as explained below.

Figure 20:
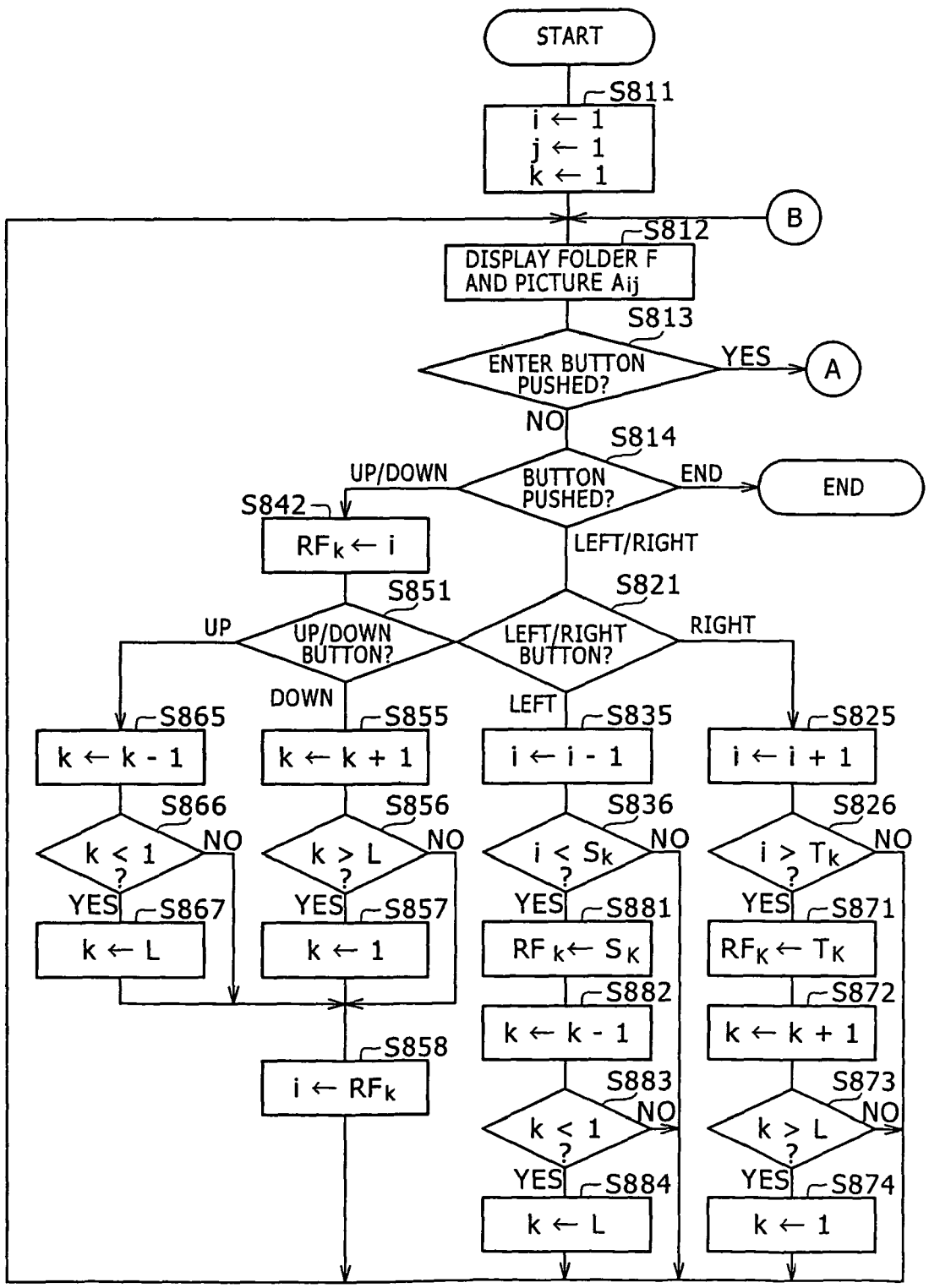
FIG. 20 is a flowchart of other steps in which folders are displayed in the second picture display example implemented by the embodiment.

FIG. 20 is a flowchart of other steps in which folders are displayed in the second picture display example implemented by the embodiment. The procedure shown in FIG. 20 is basically the same as that in FIG. 19 except that the index variable i is updated in a different manner when the left or right button 143 or 144 is pushed. The procedure is carried out as follows:

With the folder Fi displayed, pushing the right button 144 (step S821) increments the index variable i by 1 within the picture group (step S825). If at this point the index variable i is found larger than the largest folder number $T_k$ within the k-th picture group array (step S826), that largest number $T_k$ is retained as the folder resume pointer for the k-th picture group array (step S871). The index variable k denoting the picture group array is incremented by 1 (step S872). If the index variable k is found larger than the largest picture group number L (step S873), then the index variable k is set to the smallest number 1 (step S874). That is, when the right button 144 is pushed for a forward transition from the last folder within the current picture group array to a folder beyond, the first folder in the next picture group array is displayed.

With the folder $F_i$ displayed, pushing the left button 143 (step S821) decrements the index variable i by 1 within the picture group (step S835). If at this point the index variable i is found smaller than the smallest folder number $S_k$ within the k-th picture group array (step S836), that smallest number $S_k$ is retained as the folder resume pointer for the k-th picture group array (step S881). The index variable k denoting the picture group array is then decremented by 1 (step S882). If the index variable k is found smaller than the smallest picture group number 1 (step S883), then the index variable k is set to the largest number L (step S884). That is, when the left button 143 is pushed for a backward transition from the first folder in the current picture group array to a folder beyond, the last folder in the preceding picture group array is displayed.

Figure 21:
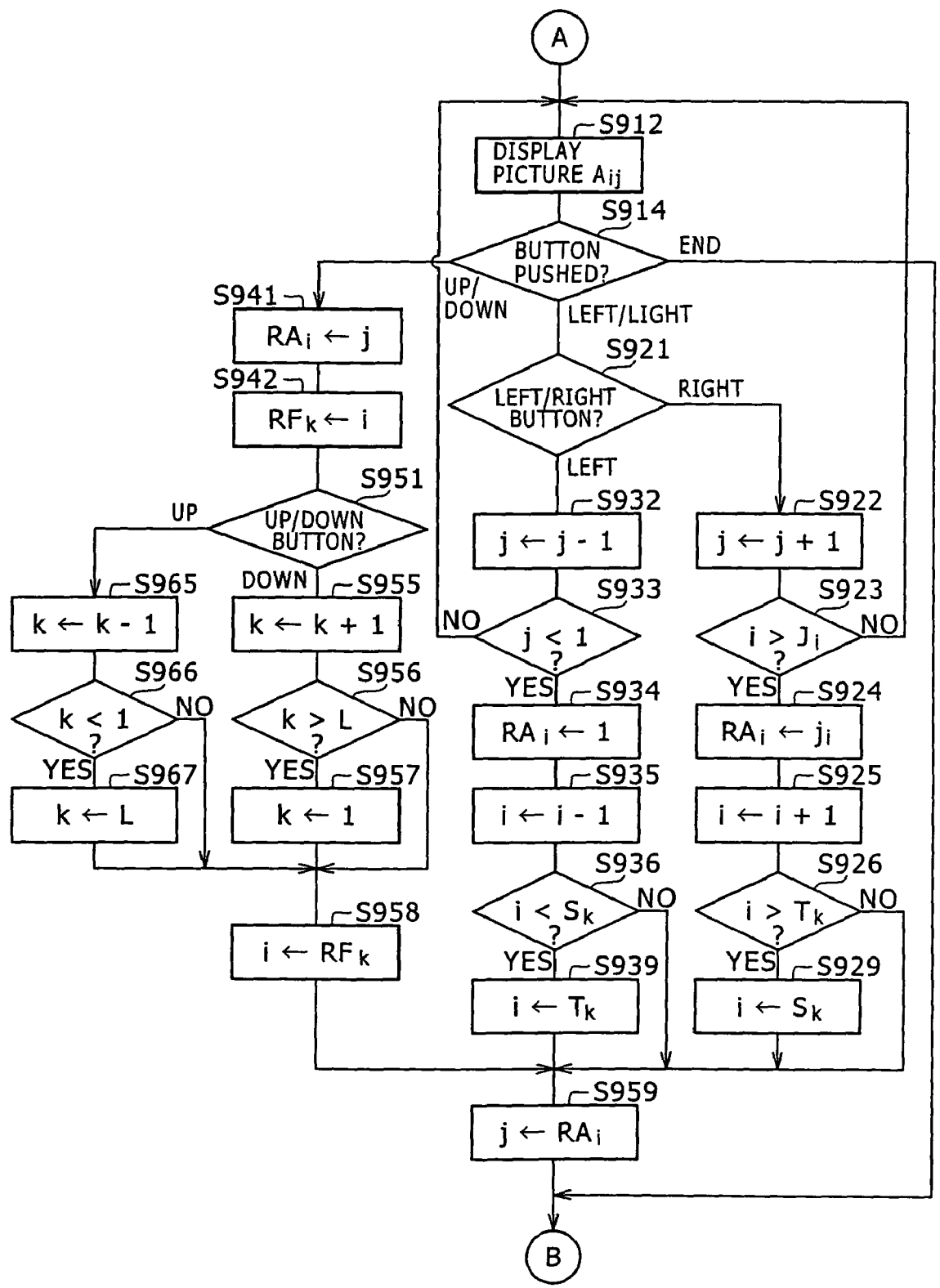
FIG. 21 is a flowchart of steps in which the second picture display example is implemented by the embodiment.

FIG. 21 is a flowchart of steps in which the second picture display example is implemented by the embodiment. Pushing the enter button 145 during execution of the procedure in FIG. 19 or 20 (step S813) causes the picture $A_{ij}$ to be displayed (step S912). Pushing the end button 146 (step S914) terminates the picture data display and brings back the folder display screen (step S812 in FIG. 19 or 20).

With the picture data item $A_{ij}$ displayed, pushing the right button 144 (step S921) increments the index variable j by 1 within the picture group (step S922). If at this point the index variable j is found smaller than the largest picture data item number $J_i$ in the i-th picture group (step S923), the next picture item $A_{ij}$ is displayed (step S912).

If the index variable j is found larger than the largest picture data item number $J_i$ in the i-th picture group (step S923), that largest number $J_i$ is retained as the picture resume pointer for the i-th picture group (step S924). The index variable i denoting the picture group is then incremented by 1 (step S925). If at this point the index variable i is found larger than the largest folder number $T_k$ in the k-th picture group array (step S926), the index variable i is set to the smallest folder number $S_k$ in the k-th picture group array (step S929). The picture resume pointer for the new picture group is established as the index variable j for the new picture data item (step S959), and the folder display screen is brought back (step S812 in FIG. 19 or 20). That is, when the right button 144 is pushed for transition across folders (i.e., picture groups), the folder display screen is displayed again.

With the picture data item $A_{ij}$ displayed, pushing the left button 143 (step S921) decrements the index variable j by 1 in the picture group (step S932). If at this point the index variable j is found larger than the smallest picture data item number 1 in the i-th picture group (step S933), the next picture item Aij is displayed (step S912).

If the index variable j is found smaller than the smallest picture data number 1 in the i-th picture group (step S333), that smallest number 1 is retained as the picture resume pointer for the i-th picture group (step S934). The index variable i denoting the picture group is then decremented by 1 (step S935). If at this point the index variable i is found smaller than the smallest folder number Sk in the k-th picture group array (step S936), the index variable i is set to the largest folder number Tk in the k-th picture group array (step S939). The picture resume pointer for the new picture group is established as the index variable j for the new picture data item (step S959), and the folder display screen is brought back (step S812 in FIG. 19 or 20). That is, when the left button 143 is pushed for transition across folders (i.e., picture groups), the folder display screen is displayed again.

With the picture data item $A_{ij}$ displayed, pushing the up button 141 or down button 142 (step S914) establishes the index variable j as the picture resume pointer for the i-th picture group (step S941) and the index variable i as the folder resume pointer for the k-th picture group array (step S942). If the up button 141 is pushed (step 951), the index variable k denoting the picture group array is decremented by 1 (step S965). If at this point the index variable k is found smaller than the smallest picture group array number 1 (step S966), the index variable k is set to the largest number L (step S967). The folder resume pointer for the new picture group array is then established as the index variable i for the new folder (step S958), and the picture resume pointer for the new picture group is set as the index variable j for the new picture data item (step S959). Thereafter the folder display screen is displayed again (step S812 in FIG. 19 or 20). That is, repeatedly pushing the up button 141 causes the picture group arrays to be displayed cyclically.

If the down button 142 is pushed (step 951), the index variable k denoting the picture group array is incremented by 1 (step S955). If at this point the index variable k is found larger than the largest picture group number L (step S956), the index variable k is set to the smallest number 1 (step S957). The folder resume pointer for the new picture group array is then established as the index variable i for the new folder (step S958), and the picture resume pointer for the new picture group is set as the index variable j for the new picture data item (step S959). The folder display screen is again displayed thereafter (step S812 in FIG. 19 or 20). That is, repeatedly pushing the down button 142 also causes the picture group arrays to be displayed cyclically.

In the example of FIG. 21 above, it was assumed that the folder display screen is displayed again if pushing any one of the up, down, left and right buttons 141 through 144 triggers transition across folders (i.e., picture groups). Alternatively, it is conceivable that pictures may be displayed across picture groups as explained below.

Figure 22:
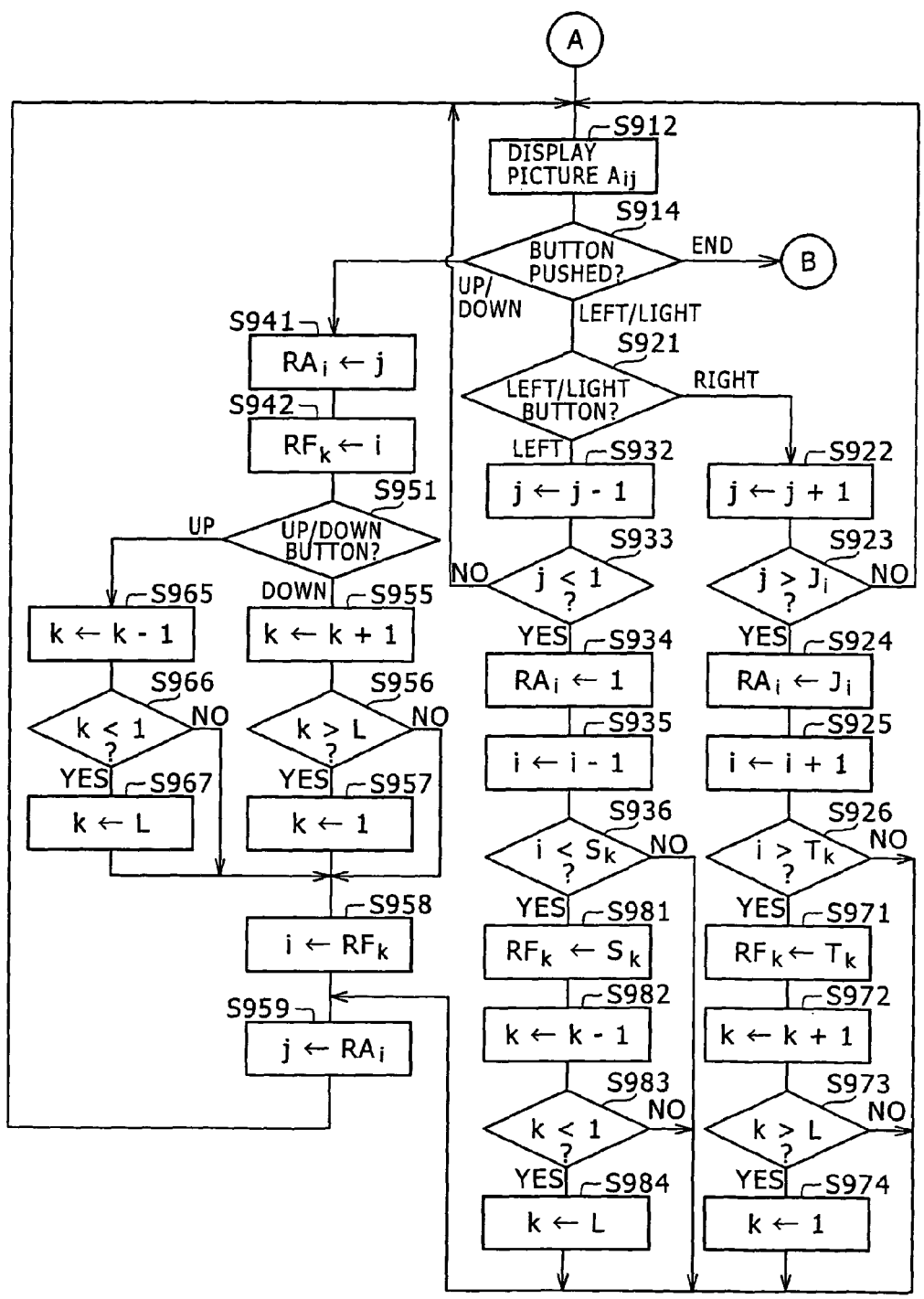
FIG. 22 is a flowchart of other steps in which the second picture display example is implemented by the embodiment.

FIG. 22 is a flowchart of other steps in which the second picture display example is implemented by the embodiment. The procedure shown in FIG. 22 is basically the same as that in FIG. 21 except that the display on the screen is switched in a different manner when any one of the up, down, left and right buttons 141 through 144 is pushed. The procedure is carried out as follows:

With the picture data item $A_{ij}$ displayed, if the push of the right button 144 (step S921) effects transition across folders (step S923), then the index variable i is incremented by 1 (step S925). If at this point the index variable i is found smaller than the largest folder number $T_k$ within the k-th picture group array (step S926), the next picture data item $A_{ij}$ is displayed (step S912).

If the index variable i is found larger than the largest folder number $T_k$ in the k-th picture group array (step S926), that largest number $T_k$ is retained as the folder resume pointer for the k-th picture group array (step S971). The index variable k denoting the picture group array is then incremented by 1 (step S972). If at this point the index variable k is found larger than the largest picture group number L (step S973), the index variable k is set to the smallest number 1 (step S974). The picture resume pointer for the new picture group is established as the index variable j for the new picture data item (step S959), and the next picture $A_{ij}$ is displayed (step S912). That is, if pushing the right button 144 triggers transition across folders (i.e., picture groups), a picture from the next folder is displayed.

With the picture data item $A_{ij}$ displayed, if the push of the left button 143 (step S921) effects transition across folders (step S933), the index variable is decremented by 1 (step S935). If at this point the index variable i is found larger than the smallest folder number $S_k$ in the k-th picture group array (step S936), the next picture $A_{ij}$ is displayed (step S912).

If the index variable i is found smaller than the smallest folder number $S_k$ in the k-th picture group array (step S936), that smallest number $S_k$ is retained as the folder resume pointer for the k-th picture group array (step S981). The index variable k denoting the picture group array is then decremented by 1 (step S982). If at this point the index variable k is found smaller than the smallest picture group number 1 (step S983), the index variable k is set to the largest number L (step S984). The picture resume pointer for the new picture group is then established as the index variable j for the new picture data item (step S959), and the next picture $A_{ij}$ is displayed (step S912). That is, if pushing the left button 143 triggers transition across folders (i.e., picture groups), a picture from the preceding folder is displayed.

With the picture data item $A_{ij}$ displayed, pushing the up button 141 or down button 142 (step S951) establishes the folder resume pointer for the new picture group array as the index variable i for the new folder (step S958), sets the picture resume pointer for the new picture group as the index variable j for the new picture data item (step S959), and causes the next picture to be displayed (step S912). That is, when the upper button 141 or down button 142 is pushed for transition across picture group arrays, a display is made of the picture data item pointed to by the picture resume pointer for the folder which in turn is indicated by the folder resume pointer for the picture group array in question.

According to the preferred embodiment of the present invention, as described above, the picture data items (550, 650) held by the data holding unit 310 are sorted into picture groups (folders 630, based on the picture-taking dates 510). At the same time, the resume pointer holding unit 320 is provided to hold the location of the picture group data most recently displayed from any one of the picture groups (using the picture resume pointers 540, 640). This arrangement improves the user's ease of operation in selecting the picture data item to be displayed on the displaying unit 350.

The picture groups are sorted into picture group arrays based on the picture-taking information 582, and the resume pointer holding unit 320 is used to hold the location of the picture group most recently selected from any one of the picture group arrays (the location is indicated by the folder resume pointer 620). This arrangement enhances the user's ease of operation in selecting the desired picture group.

Although the description above contains many specificities, these should not be construed as limiting the scope of the invention but as merely providing illustrations of the presently preferred embodiments of this invention. Thus it is to be understood that changes and variations may be made without departing from the spirit or scope of the claims that follow.

Illustratively, in claim 1 of the present invention, the data holding means corresponds to the data holding unit 310, the resume pointer holding means to the resume pointer holding unit 320, and the picture resume pointer to the picture resume pointer 540 or 640. The operation inputting means corresponds illustratively to the operation inputting unit 340 and the display controlling means to the display controlling unit 390.

In claim 2, 3, 6, 7 or 8 of the present invention, the picture data switching operation inputting means corresponds illustratively to the left and right buttons 143 and 144.

In claim 4 or 9 of the present invention, the picture-taking information corresponds illustratively to the picture-taking information 582.

In claim 5 of the present invention, the data holding means corresponds illustratively to the data holding unit 310. The picture resume pointer holding means and the picture group resume pointer holding means correspond illustratively to the resume pointer holding unit 320. The picture resume pointer corresponds to the picture resume pointer 540 or 640, and the picture group resume pointer to the folder resume pointer 620. The operation inputting means corresponds illustratively to the operation inputting unit 340 and the display controlling means to the display controlling unit 390.

In claim 10 of the present invention, the data holding means corresponds illustratively to the data holding unit 310 and the resume pointer holding means to the resume pointer holding unit 320. The picture resume pointer corresponds to the picture resume pointer 540 or 640. The operation inputting means corresponds illustratively to the operation inputting unit 340, the displaying means to the displaying unit 350, and the display controlling means to the display controlling unit 390.

In claim 11 of the present invention, the data holding means corresponds illustratively to the data holding unit 310, and the picture resume pointer holding means and picture group resume pointer holding means correspond illustratively to the resume pointer holding unit 320. The picture resume pointer corresponds to the picture resume pointer 540 or 640 and the picture group resume pointer to the folder resume pointer 620. The operation inputting means corresponds illustratively to the operation inputting unit 340, the displaying means to the displaying unit 350, and the display controlling means to the display controlling unit 390.

In claim 12 or 14 of the present invention, the data holding means corresponds illustratively to the data holding unit 310, the resume pointer holding means to the resume pointer holding unit 320, and the picture resume pointer to the picture resume pointer 540 or 640.

In claim 13 or 15 of the present invention, the data holding means corresponds illustratively to the data holding unit 310, and the picture resume pointer holding means and picture group resume pointer holding means correspond illustratively to the resume pointer holding unit 320. The picture resume pointer corresponds to the picture resume pointer 540 or 640, and the picture group resume pointer to the folder resume pointer 620.

The procedures described above in connection with the preferred embodiments of the present invention may each be regarded as a method having a series of steps, as a program for causing a computer to carry out these steps, or as a recording medium which accommodates that program.

INDUSTRIAL APPLICABILITY

The present invention applies illustratively to a picture displaying apparatus having a small-size display screen such as that of digital cameras, the apparatus being implemented for selectively displaying pictures.

The invention claimed is:

1. An image data display controlling apparatus comprising:
   storing means for storing a plurality of image data items categorized by a plurality of image data groups using geographical location;
   operation inputting means for accepting an operation input for designating any of said image data groups or any of the image data items in the designated image group;
   display controlling means for controlling to display designated image data group or designated image data item in the designated image data group;
   pointer holding means for holding a pointer information for identifying image data item associating with a image data group, the pointer information is used for controlling to display the image data item in the designated image data group when a transition of image data group is instructed by the operation inputting means;
   wherein, if said operation input accepted by said operation inputting means designates transition from a first image data group to a second image data group, then said display controlling means causes said pointer holding means to hold the pointer information of predetermined image data item from said first image data group associating with said first image data group, while retrieving the pointer information for said second image data group from said pointer holding means in order to display anew the image data item pointed to by the retrieved pointer information.

2. An image data display controlling apparatus according to claim 1, wherein
   said operation inputting means comprises picture data switching operation inputting means for accepting an operation input for switching said picture data items on an item by item basis, and
   wherein a plurality of picture groups are displayed so as to arrange picture groups which have the same location information on one direction.

3. An image data display controlling apparatus according to claim 1, wherein
   said operation inputting means comprises picture data switching operation inputting means for accepting an operation input for switching said picture data items on an item by item basis,
   wherein picture groups are obtained by sorting said picture data items according to the location information and time information of which the picture data was acquired, and
   wherein each picture group is displayed using at least the location information and time information used in sorting said picture items.

4. An image data display controlling according to claim 1, wherein
display controlling means updates the picture resume pointer for an old picture group and references the picture resume pointer for a new picture group when a transition is made from picture group to another for picture data display.

5. An image data display controlling according to claim 1, wherein
display controlling means updates the folder resume pointer for an old picture group array and references the folder resume pointer for a new picture group array when a transition is made from one picture group array to another for a selection of the picture group.

6. An image data display controlling method comprising the steps of:
storing a plurality of image data items categorized by a plurality of image data groups using geographical location;
accepting an operation input for designating any of said image data groups or any of the image data items in the designated image group;
controlling of a display of designated image data group or designated image data item in the designated image data group;
holding a pointer information for identifying image data item associating with a image data group, the pointer information is used for controlling to display the image data item in the designated image data group when a transition of image data group is instructed by the operation input;
wherein, if said operation input designates transition from a first image data group to a second image data group, then said controlling of a display causes said pointer information to hold information of predetermined image data item from said first image data group associating with said first image data group, while retrieving information for said second image data group from said pointer information in order to display anew the image data item pointed to by the retrieved information.

7. An image data display controlling method according claim 6, wherein
said operation input comprises picture data switching operation input for accepting an operation input for switching said picture data items on an item by item basis, and
wherein a plurality of picture groups are displayed so as to arrange picture groups which have the same location information on one direction.

8. An image data display controlling method according claim 6, wherein
said operation input comprises picture data switching operation input for accepting an operation input for switching said picture data items on an item by item basis,
wherein picture groups are obtained by sorting said picture data items according to the location information and time information of which the picture data was acquired, and
wherein each picture group is displayed using at least the location information and time information used in sorting said picture items.

9. An image data display controlling method according claim 6, wherein
controlling of a display updates the picture resume pointer for an old picture group and references the picture resume pointer for a new picture group when a transition is made from picture group to another for picture data display.

10. An image data display controlling apparatus according claim 6, wherein
controlling of a display updates the folder resume pointer for an old picture group array and references the folder resume pointer for a new picture group array when a transition is made from one picture group array to another for a selection of the picture group.

11. A computer program product comprising a non-transitory computer readable medium that stores program code executable for performing operations comprising:
storing a plurality of image data items categorized by a plurality of image data groups using geographical location;
accepting an operation input for designating any of said image data groups or any of the image data items in the designated image group;
controlling of a display of designated image data group or designated image data item in the designated image data group;
holding a pointer information for identifying image data item associating with a image data group, the pointer information is used for controlling to display the image data item in the designated image data group when a transition of image data group is instructed by the operation input;
wherein, if said operation input designates transition from a first image data group to a second image data group, then said controlling of a display causes said pointer information to hold information of predetermined image data item from said first image data group associating with said first image data group, while retrieving information for said second image data group from said pointer information in order to display anew the image data item pointed to by the retrieved information.

12. A computer program product according to claim 11, wherein
said operation input comprises picture data switching operation input for accepting an operation input for switching said picture data items on an item by item basis, and
wherein a plurality of picture groups are displayed so as to arrange picture groups which have the same location information on one direction.

13. A computer program product according to claim 11, wherein
said operation input comprises picture data switching operation input for accepting an operation input for switching said picture data items on an item by item basis,
wherein picture groups are obtained by sorting said picture data items according to the location information and time information of which the picture data was acquired, and
wherein each picture group is displayed using at least the location information and time information used in sorting said picture items.

14. A computer program product according to of claim 11, wherein
controlling of a display updates the picture resume pointer for an old picture group and references the picture resume pointer for a new picture group when a transition is made from picture group to another for picture data display.

15. A computer program product according to claim 11, wherein
controlling of a display updates the folder resume pointer for an old picture group array and references the folder resume pointer for a new picture group array when a transition is made from one picture group array to another for a selection of the picture group.

* * * * *